(12) United States Patent
Islam et al.

(10) Patent No.: US 11,647,459 B2
(45) Date of Patent: May 9, 2023

(54) NETWORK CONTROL AND SIGNALING FOR POWER CIRCUITRY CONFIGURATION

(71) Applicant: QUALCOMM Incorporated, San Diego, CA (US)

(72) Inventors: Muhammad Nazmul Islam, Littleton, MA (US); Junyi Li, Chester, NJ (US); Juergen Cezanne, Ocean Township, NJ (US); Joseph Patrick Burke, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 16/775,072

(22) Filed: Jan. 28, 2020

(65) Prior Publication Data
US 2020/0260376 A1 Aug. 13, 2020

Related U.S. Application Data

(60) Provisional application No. 62/804,185, filed on Feb. 11, 2019.

(51) Int. Cl.
*H04W 52/02* (2009.01)
(52) U.S. Cl.
CPC .............................. *H04W 52/0212* (2013.01)
(58) Field of Classification Search
None
See application file for complete search history.

(56) References Cited

U.S. PATENT DOCUMENTS 6,628,946 B1 * 9/2003 Wiberg ................. H04W 48/12
455/434
11,201,780 B2 * 12/2021 Yu ......................... H04L 47/365
(Continued)

FOREIGN PATENT DOCUMENTS

CN 110557813 B * 6/2018

OTHER PUBLICATIONS

U.S. Appl. No. 62/699,465 provisional of Cheng—US20200029274 disclose adequate support for relied upon subject matter. (Year: 2018).*

(Continued)

*Primary Examiner* — Andre Tacdiran
(74) *Attorney, Agent, or Firm* — Holland & Hart LLP

(57) ABSTRACT

The described techniques provide for the identification and utilization of different power consumption categories by a user equipment (UE) in wireless communications system. A power consumption category may correspond to a power consumption level (e.g., a powered circuitry configuration) of the UE. For example, a power consumption category may configure an analog-to-digital conversion (ADC) resolution, a digital-to-analog conversion (DAC) resolution, a number of antennas, etc., that a UE may employ for communications. In some examples, a UE may report capability information to a base station, and the base station may use the information to explicitly or implicitly (e.g., via conveying thresholds or conditions to the UE for power consumption category switching or power consumption category selection) configure the UE with various power consumption categories. As such, the power consumption categories may be used by the base station and UE, in some scenarios, for reducing power consumption.

23 Claims, 16 Drawing Sheets

(56) References Cited

U.S. PATENT DOCUMENTS

| | | | |
|---|---|---|---|
| 2004/0042435 A1* | 3/2004 | Soomro | H04W 72/1289 370/338 |
| 2005/0003759 A1* | 1/2005 | Alley | H04M 1/72502 455/41.2 |
| 2011/0086638 A1* | 4/2011 | Medapalli | H04W 52/42 455/436 |
| 2011/0128871 A1* | 6/2011 | Yuan | H04L 1/0016 370/252 |
| 2011/0222469 A1* | 9/2011 | Ali | H04L 1/0009 370/328 |
| 2013/0077506 A1* | 3/2013 | Hu | H04W 72/085 370/252 |
| 2014/0004862 A1* | 1/2014 | Ekemark | H04W 36/22 455/443 |
| 2015/0003333 A1* | 1/2015 | Maguire | H04W 60/00 370/328 |
| 2015/0195796 A1* | 7/2015 | Sivanesan | H04W 52/146 370/329 |
| 2015/0346807 A1* | 12/2015 | Homchaudhuri | G06F 1/3278 713/323 |
| 2015/0351032 A1* | 12/2015 | Homchaudhuri | H04W 52/0229 370/311 |
| 2016/0219510 A1* | 7/2016 | Asterjadhi | H04W 28/0221 |
| 2016/0302092 A1 | 10/2016 | Sartori et al. | |
| 2016/0353410 A1* | 12/2016 | Wang | H04W 8/005 |
| 2017/0135046 A1* | 5/2017 | Sutskover | H04W 52/241 |
| 2017/0188276 A1* | 6/2017 | Melin | H04W 76/27 |
| 2017/0373398 A1* | 12/2017 | Komulainen | H04W 72/0413 |
| 2018/0020402 A1* | 1/2018 | Emmanuel | H04W 4/021 |
| 2018/0084506 A1* | 3/2018 | Min | H04L 5/14 |
| 2019/0174434 A1* | 6/2019 | Koskinen | H04W 52/50 |
| 2019/0260495 A1* | 8/2019 | Nammi | H04L 1/0009 |
| 2019/0261294 A1* | 8/2019 | Gupta | H04L 5/0048 |
| 2019/0349914 A1* | 11/2019 | Xu | H04W 72/044 |
| 2020/0029274 A1* | 1/2020 | Cheng | H04W 52/0216 |
| 2020/0241621 A1* | 7/2020 | Douglas | A43B 3/0005 |
| 2020/0260462 A1* | 8/2020 | Elad | H04W 52/367 |
| 2020/0344691 A1* | 10/2020 | Liu | H04W 52/0216 |
| 2021/0029643 A1* | 1/2021 | Stauffer | H04W 52/0229 |
| 2021/0135919 A1* | 5/2021 | Lee | H04W 52/146 |
| 2021/0195517 A1* | 6/2021 | Yang | H04W 52/0229 |
| 2021/0204216 A1* | 7/2021 | Yang | H04W 52/0235 |

OTHER PUBLICATIONS

Stauffer—U.S. Appl. No. 62/686,506 provisional of Stauffer_643 US20210029643) disclose adequate support for relied upon subject matter. (Year: 2018).*

"3rd Generation Partnership Project; Technical Specification Group Radio AccessNetwork; NR; Study on UE Power Saving (Release 16)", 3GPP Standard; Technical Report; 3GPP TR 38.840, 3rd Generation Partnership Project (3GPP), Mobile Competence Centre, 650, Route Des Lucioles, F-06921, Sophia-Antipolis Cedex, France, No. V0.1.0, Nov. 29, 2018 (Nov. 28, 2018), pp. 1-24, XP051590958, [retrieved on Nov. 29, 2018], the whole document.

Interdigital, et al., "On Power Saving Techniques," 3GPP Draft, 3GPP TSG RAN WG1 Ad-Hoc Meeting 1901, R1-1900813, PowerSaving Techniques_Final, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593659, 7 pages, Retrieved from the Internet:URL: http://www.3gpp.org/ftp/Meetings%5F3GPP%5FSYNC/RAN1/Docs/R1%2D1900813%2Ezip [retrieved on Jan. 20, 2019], the whole document.

International Search Report and Written Opinion—PCT/US2020/015731—ISA/EPO—dated May 26, 2020 (191431WO).

Samsung: "UE Capability Size Reduction", 3GPP Draft, 3GPP TSG-RAN2#91 bis meeting, R2-154732, UE Capability Size Reduction, 3rd Generation Partnership Project (3GPP), Mobile Competence Centre, 650, Route Des Lucioles, F-06921, Sophia-Antipolis Cedex, France, vol. RAN WG2, No. Malmo, Sweden; Oct. 5, 2015-Oct. 9, 2015, Oct. 4, 2015 (Oct. 4, 2015), XP051005222, 3 pages, Retrieved from the Internet: URL: http://www.3gpp.org/ftp/Meetings_3GPP_SYNC/RAN2/Docs/ [retrieved on Oct. 4, 2015], the whole document.

Vivo: "UE Radio Access Capabilities Change", 3GPP Draft, 3GPP TSG-RAN WG2 Meeting #103, R2-1811767, UE Radio Access Capabilities Change, 3rd Generation Partnership Project (3GPP), Mobile Competence Centre, 650, Route Des Lucioles, F-06921, Sophia-Antipolis Cedex, France, vol. RAN WG2, No. Gothenburg, Sweden; Aug. 20, 2018-Aug. 24, 2018, Aug. 10, 2018 (Aug. 10, 2018), XP051521406, 3 pages, Retrieved from the Internet: URL: http://www.3gpp.org/ftp/tsg%5Fran/WG2%5FRL2/TSGR2%5F103/Docs/R2%2D1811767%2Ezip [retrieved on Aug. 10, 2018], the whole document.

* cited by examiner

NETWORK CONTROL AND SIGNALING FOR POWER CIRCUITRY CONFIGURATION

CROSS REFERENCE

The present Application for Patent claims the benefit of U.S. Provisional Patent Application No. 62/804,185 by ISLAM et al., entitled "NETWORK CONTROL AND SIGNALING FOR POWER CIRCUITRY CONFIGURATION," filed Feb. 11, 2019, assigned to the assignee hereof, and expressly incorporated herein.

BACKGROUND

The following relates generally to wireless communications, and more specifically to network control and signaling for power circuitry configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless devices communicating in a wireless network may use various hardware components, functional processes, and the like, to support wireless communications. Each component/process utilized by a wireless device generally consumes power. The amount and/or configuration of such components/processes may be based at least in some aspects on the configuration of the wireless network. For example, some networks (such as legacy networks) may be configured such that minimal components/processes are used to support wireless communications, whereas other networks (such as advanced networks, e.g., NR or 5G networks) may use more components/processes to support wireless communications. Thus, advances in wireless networks may have a corresponding increase in power consumption by the wireless devices. While such advances may improve network performance overall, this may create difficulties in terms of power consumption (e.g., battery life) for the wireless devices.

SUMMARY

The described techniques relate to improved methods, systems, devices, or apparatuses that support network control and signaling for power circuitry configuration. Generally, the described techniques provide for the identification and utilization of different power consumption categories by a wireless device in a wireless communications system (e.g., by a user equipment (UE) operating in an advanced wireless network, such as a New Radio (NR) network, fifth generation (5G) network, and the like). In some examples, a UE may report capability information to a base station that the base station may use to determine a set of UE power consumption categories. In some examples, a wireless communications system may configure different power consumption categories, and a UE may report which power consumption categories the UE is capable of to the network.

A power consumption category may correspond to a power consumption level (e.g., a powered circuitry configuration) of the UE. For example, a power consumption category may configure an analog-to-digital conversion (ADC) resolution, a digital-to-analog conversion (DAC) resolution, a number of antennas, etc., that a UE may employ for communications. As such, a set of UE power consumption categories may be established based on the capabilities of the UE to configure (e.g., power, or conversely turn-off) various ADC/DAC circuitry, antenna circuitry (e.g., various antenna elements or antenna sub-arrays), etc. Further, UE power consumption categories may be selected or implemented based at least in part on power consumption levels (e.g., power consumption rates) associated with circuitry configurations of the various UE power consumption categories. In some examples, the UE may utilize different power consumption categories for different traffic demands, path loss conditions, capabilities of the wireless device or other wireless devices in the system, etc., balancing the trade-off between more advanced communication needs and power consumption (e.g., battery) constraints.

Therefore, based on a received indication of UE capability information, a base station may explicitly configure a UE with a power consumption category or may configure various thresholds (e.g., or conditions) for UE power consumption category selection. For example, the base station may implicitly configure a UE with a power consumption category (e.g., may configure conditions for which a UE may select certain power consumption categories) based on UE idle mode signal measurements, based on modulation coding schemes (MCSs) used by the UE, based on traffic demands, etc. In other examples, a UE may autonomously select power consumption categories. For example, in some cases, a UE may autonomously select a power consumption category based on user input, a detected low battery status, a thermal state of the UE, etc.

A method of wireless communication at a UE is described. The method may include determining UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof, transmitting an indication of the UE capability information for the set of power consumption categories to a base station, and receiving an indication of power consumption category switching information in response to the transmitted indication of the UE capability information for the set of power consumption categories.

An apparatus for wireless communication at a UE is described. The apparatus may include a processor, memory in electronic communication with the processor, and instructions stored in the memory. The instructions may be executable by the processor to cause the apparatus to determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof, transmit an indication of the UE capability information for the set of power consumption categories to a base station, and receive an indication of power consumption category switching information in response to the transmitted indication of the UE capability information for the set of power consumption categories.

Another apparatus for wireless communication at a UE is described. The apparatus may include means for determining UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof, transmitting an indication of the UE capability information for the set of power consumption categories to a base station, and receiving an indication of power consumption category switching information in response to the transmitted indication of the UE capability information for the set of power consumption categories.

A non-transitory computer-readable medium storing code for wireless communication at a UE is described. The code may include instructions executable by a processor to determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof, transmit an indication of the UE capability information for the set of power consumption categories to a base station, and receive an indication of power consumption category switching information in response to the transmitted indication of the UE capability information for the set of power consumption categories.

Some examples of the method, apparatuses, and non-transitory computer-readable medium described herein may further include operations, features, means, or instructions for determining a power consumption level for each power consumption category based on modem radio frequency circuitry associated with the resolution for the analog-to-digital conversion, modem radio frequency circuitry associated with the resolution for the digital-to-analog conversion, circuitry associated with the antenna configuration, circuitry associated with the radio frequency circuit configuration, circuitry associated with the intermediate frequency circuitry configuration, circuitry associated with the baseband circuit configuration, or some combination thereof.

In some examples of the method, apparatuses, and non-transitory computer-readable medium described herein, the indication of the UE capability information for the set of power consumption categories includes the power consumption level for each power consumption category.

In some examples of the method, apparatuses, and non-transitory computer-readable medium described herein, receiving an indication of power consumption category switching information may include operations, features, means, or instructions for receiving, from the base station, an indication to switch to a first power consumption category of the set of power consumption categories.

In some examples of the method, apparatuses, and non-transitory computer-readable medium described herein, receiving an indication of power consumption category switching information may include operations, features, means, or instructions for receiving, from the base station, an indication of a threshold for selecting a first power consumption category of the set of power consumption categories.

In some examples of the method, apparatuses, and non-transitory computer-readable medium described herein, the threshold for selecting the first power consumption category of the set of power consumption categories includes a reference signal receive power threshold, a reference signal receive quality threshold, a signal-to-noise ratio threshold, a signal-to-noise-plus-interference ratio, or some combination thereof.

Some examples of the method, apparatuses, and non-transitory computer-readable medium described herein may further include operations, features, means, or instructions for measuring one or more signals from the base station, determining the measurement satisfies the threshold, and selecting the first power consumption category of the set of power consumption categories based on the determination that the measurement satisfies the threshold.

In some examples of the method, apparatuses, and non-transitory computer-readable medium described herein, the one or more signals include a primary synchronization signal, a secondary synchronization signal, a physical broadcast channel transmission, a channel state information reference signal, a tracking reference signal, a remaining system information transmission, other system information transmission, a random access channel transmission, a paging physical downlink control channel transmission, a paging physical downlink shared channel transmission, or some combination thereof.

In some examples of the method, apparatuses, and non-transitory computer-readable medium described herein, the UE uses the one or more signals during idle mode operation.

In some examples of the method, apparatuses, and non-transitory computer-readable medium described herein, the threshold for selecting the first power consumption category of the set of power consumption categories includes a thermal state threshold of the UE, a battery status threshold of the UE, or some combination thereof.

Some examples of the method, apparatuses, and non-transitory computer-readable medium described herein may further include operations, features, means, or instructions for determining a thermal state of the UE may have satisfied the threshold, a battery status of the UE may have satisfied a threshold, or both, and selecting the first power consumption category of the set of power consumption categories based on the determination that the thermal state of the UE satisfies the threshold, that the battery status of the UE satisfies the threshold, or both.

In some examples of the method, apparatuses, and non-transitory computer-readable medium described herein, receiving an indication of power consumption category switching information may include operations, features, means, or instructions for receiving an indication of a quality of service requirement, and selecting a first power consumption category of the set of power consumption categories based on the indication of the quality of service requirement.

In some examples of the method, apparatuses, and non-transitory computer-readable medium described herein, receiving an indication of power consumption category switching information may include operations, features, means, or instructions for receiving, from the base station, an indication of a mapping of one or modulation coding schemes to one or more power consumption categories of the set of power consumption categories.

Some examples of the method, apparatuses, and non-transitory computer-readable medium described herein may further include operations, features, means, or instructions for identifying a configuration for a modulation coding scheme, and selecting a first power consumption category of the set of power consumption categories based on the configuration for the modulation coding scheme and the mapping.

In some examples of the method, apparatuses, and non-transitory computer-readable medium described herein, the indication of the set of power consumption categories includes the resolution for the analog-to-digital conversion for each power consumption category, the resolution for the digital-to-analog conversion for each power consumption category, the antenna configuration of the UE for each power consumption category, the radio frequency circuit configuration of the UE for each power consumption category, the intermediate frequency circuit configuration of the UE for each power consumption category, the baseband circuit configuration of the UE for each power consumption category, or some combination thereof.

Some examples of the method, apparatuses, and non-transitory computer-readable medium described herein may further include operations, features, means, or instructions for selecting a first power consumption category of the set of power consumption categories based on the received indication of power consumption category switching information, selecting a first resolution for the analog-to-digital conversion, a first resolution for the digital-to-analog conversion, a first antenna configuration, a number of subarrays, a number of antennas, a first radio frequency circuit configuration, a first intermediate frequency circuit configuration of the UE, or some combination thereof, based on the selected first power consumption category, and determining whether to turn on one or more portions of UE circuitry corresponding to the selected first resolution for the analog-to-digital conversion, the selected first resolution for the digital-to-analog conversion, the selected first antenna configuration, the selected number of subarrays, the selected number of antennas, the selected first radio frequency circuit configuration, the selected first intermediate frequency circuit configuration of the UE, or some combination thereof.

A method of wireless communication at a UE is described. The method may include determining UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof, determining a condition for UE operation in a first power consumption category of the set of power consumption categories has been satisfied, and selecting the first power consumption category of the set of power consumption categories based on the determination that the condition has been satisfied.

An apparatus for wireless communication at a UE is described. The apparatus may include a processor, memory in electronic communication with the processor, and instructions stored in the memory. The instructions may be executable by the processor to cause the apparatus to determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof, determine a condition for UE operation in a first power consumption category of the set of power consumption categories has been satisfied, and select the first power consumption category of the set of power consumption categories based on the determination that the condition has been satisfied.

Another apparatus for wireless communication at a UE is described. The apparatus may include means for determining UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof, determining a condition for UE operation in a first power consumption category of the set of power consumption categories has been satisfied, and selecting the first power consumption category of the set of power consumption categories based on the determination that the condition has been satisfied.

A non-transitory computer-readable medium storing code for wireless communication at a UE is described. The code may include instructions executable by a processor to determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof, determine a condition for UE operation in a first power consumption category of the set of power consumption categories has been satisfied, and select the first power consumption category of the set of power consumption categories based on the determination that the condition has been satisfied.

In some examples of the method, apparatuses, and non-transitory computer-readable medium described herein, determining that the condition may have been satisfied may include operations, features, means, or instructions for receiving a user input selection of the first power consumption category of the set of power consumption categories, where the determination that the condition may have been satisfied may be based on the received user input selection.

In some examples of the method, apparatuses, and non-transitory computer-readable medium described herein, determining that the condition may have been satisfied may include operations, features, means, or instructions for determining a thermal state of the UE may have exceeded a thermal state threshold, a battery status of the UE may have exceeded a battery status threshold, or both, where the determination that the condition may have been satisfied may be based on the determination that the thermal state of the UE exceeds the thermal state threshold, that the battery status of the UE exceeds the battery status threshold, or both.

In some examples of the method, apparatuses, and non-transitory computer-readable medium described herein, determining that the condition may have been satisfied may include operations, features, means, or instructions for selecting a first resolution for the analog-to-digital conversion, a first resolution for the digital-to-analog conversion, a first antenna configuration, a number of subarrays, a number of antennas, a first radio frequency circuit configuration, a first intermediate frequency circuit configuration of the UE, or some combination thereof, based on the selected first power consumption category, and determining whether to turn on one or more portions of UE circuitry corresponding to the selected first resolution for the analog-to-digital conversion, the selected first resolution for the digital-to-analog conversion, the selected first antenna configuration, the selected number of subarrays, the selected number of antennas, the selected first radio frequency circuit configuration, the selected first intermediate frequency circuit configuration of the UE, or some combination thereof.

A method of wireless communication at a base station is described. The method may include receiving an indication of UE capability information for a set of power consumption categories for the UE, determining a condition for UE operation in a first power consumption category of the set of power consumption categories, and transmitting, to the UE, an indication of power consumption category switching information based on the determined condition.

An apparatus for wireless communication at a base station is described. The apparatus may include a processor, memory in electronic communication with the processor, and instructions stored in the memory. The instructions may be executable by the processor to cause the apparatus to receive an indication of UE capability information for a set of power consumption categories for the UE, determine a condition for UE operation in a first power consumption category of the set of power consumption categories, and transmit, to the UE, an indication of power consumption category switching information based on the determined condition.

Another apparatus for wireless communication at a base station is described. The apparatus may include means for receiving an indication of UE capability information for a set of power consumption categories for the UE, determining a condition for UE operation in a first power consumption category of the set of power consumption categories, and transmitting, to the UE, an indication of power consumption category switching information based on the determined condition.

A non-transitory computer-readable medium storing code for wireless communication at a base station is described. The code may include instructions executable by a processor to receive an indication of UE capability information for a set of power consumption categories for the UE, determine a condition for UE operation in a first power consumption category of the set of power consumption categories, and transmit, to the UE, an indication of power consumption category switching information based on the determined condition.

Some examples of the method, apparatuses, and non-transitory computer-readable medium described herein may further include operations, features, means, or instructions for identifying, based on the received indication, a power consumption level for each power consumption category of the set of power consumption categories, a resolution for an analog-to-digital conversion for each power consumption category of the set of power consumption categories, a resolution for a digital-to-analog conversion for each power consumption category of the set of power consumption categories, an antenna configuration of the UE for each power consumption category of the set of power consumption categories, a radio frequency circuit configuration of the UE for each power consumption category of the set of power consumption categories, an intermediate frequency circuit configuration of the UE for each power consumption category of the set of power consumption categories, a baseband circuit configuration of the UE for each power consumption category of the set of power consumption categories, or some combination thereof, where the condition may be determined based on the identifying.

In some examples of the method, apparatuses, and non-transitory computer-readable medium described herein, determining the condition for UE operation in the first power consumption category may include operations, features, means, or instructions for determining, for each of one or more power consumption categories of the set of power consumption categories, a reference signal receive power threshold, a reference signal receive quality threshold, a signal-to-noise ratio threshold, a signal-to-noise-plus-interference ratio, or some combination thereof.

Some examples of the method, apparatuses, and non-transitory computer-readable medium described herein may further include operations, features, means, or instructions for transmitting one or more signals including a primary synchronization signal, a secondary synchronization signal, a physical broadcast channel transmission, a remaining system information transmission, other system information transmission, a random access channel transmission, a paging physical downlink control channel transmission, a paging physical downlink shared channel transmission, or some combination thereof, where the condition for UE operation in the first power consumption category may be based on the transmitted one or more signals.

In some examples of the method, apparatuses, and non-transitory computer-readable medium described herein, determining the condition for UE operation in the first power consumption category may include operations, features, means, or instructions for determining a thermal state threshold of the UE, a battery status threshold of the UE, or some combination thereof.

In some examples of the method, apparatuses, and non-transitory computer-readable medium described herein, determining the condition for UE operation in the first power consumption category may include operations, features, means, or instructions for determining a mapping of one or more quality of service requirements to one or more power consumption categories of the set of power consumption categories, where the power consumption category switching information includes the mapping, and transmitting an indication of a quality of service requirement to the UE.

In some examples of the method, apparatuses, and non-transitory computer-readable medium described herein, determining the condition for UE operation in the first power consumption category may include operations, features, means, or instructions for determining a mapping of one or more modulation coding schemes to one or more power consumption categories of the set of power consumption categories, where the power consumption category switching information includes the mapping.

Some examples of the method, apparatuses, and non-transitory computer-readable medium described herein may further include operations, features, means, or instructions for determining the condition may have been satisfied, where the indication of power consumption category switching information includes an indication of the first power consumption category based on the determination that the condition for UE operation in the first power consumption category may have been satisfied.

In some examples of the method, apparatuses, and non-transitory computer-readable medium described herein, determining the condition may have be satisfied may include operations, features, means, or instructions for determining the UE may be capable of operating in the first power consumption category based on the received indication of UE capability information.

In some examples of the method, apparatuses, and non-transitory computer-readable medium described herein, the indication of power consumption category switching information includes the determined condition.

DETAILED DESCRIPTION

Figure 1:
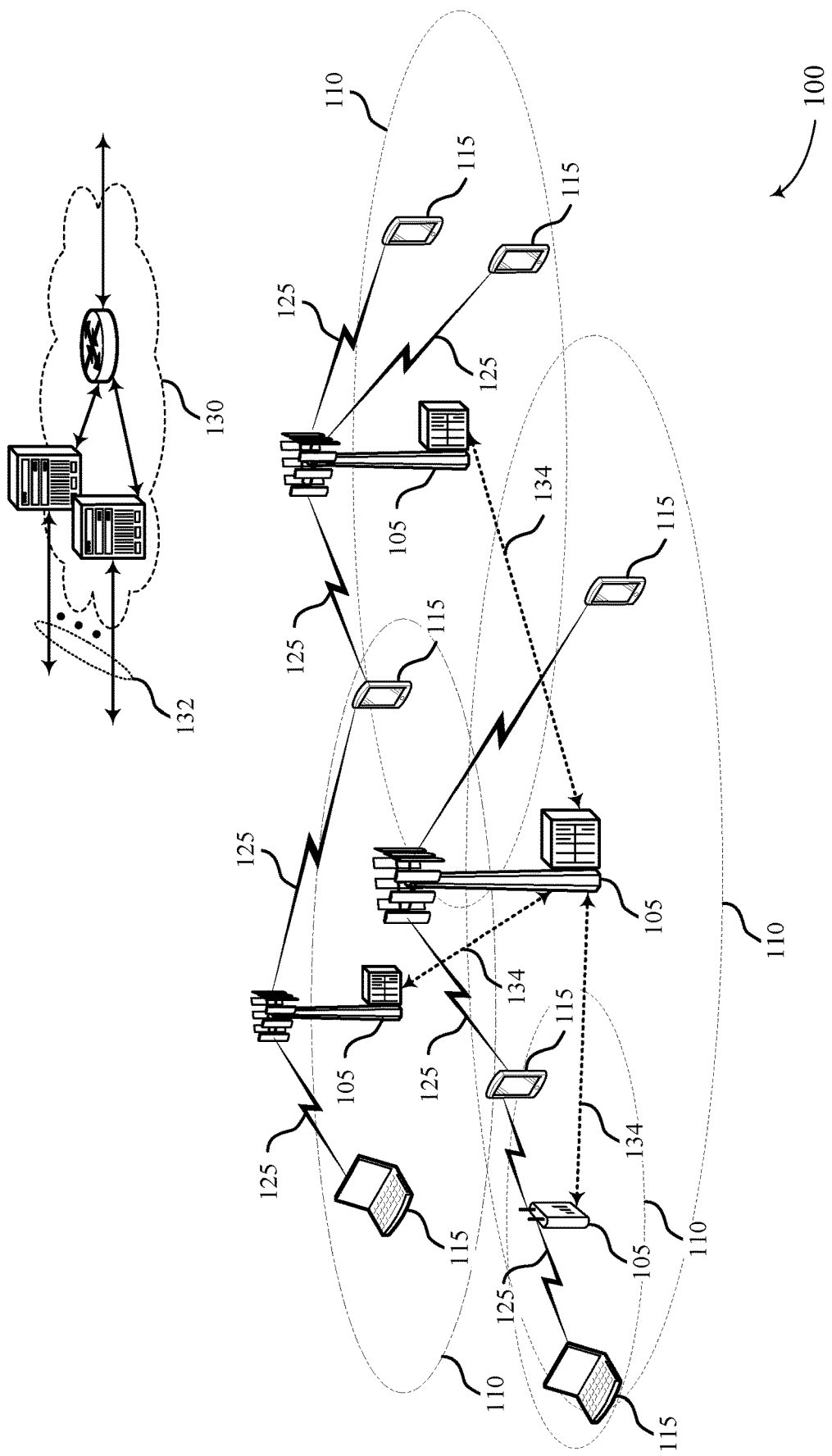
FIG. 1 illustrates an example of a system for wireless communications that supports network control and signaling for power circuitry configuration in accordance with aspects of the present disclosure.

Wireless communication systems may be configured differently, such that some wireless networks may be more complicated or otherwise complex than other wireless networks. Examples include, but are not limited to, millimeter wave (mmW) networks, New Radio (NR) networks, fifth generation (5G) networks, or any network supporting higher bandwidth/throughput, any network supporting a high number of antennas (e.g., to support directional transmissions), and the like. As networks continue to advance, this may have a corresponding increase in the complexity of hardware and/or processes utilized during wireless communications. Each hardware, process, and the like, may have a corresponding power consumption cost for the wireless device operating on the network.

As one non-limiting example, a receiving wireless device may consume a large amount of power monitoring for synchronization signals, reference signals, tracking signals, and the like, in a wireless network utilizing a higher bandwidth and/or in a directional manner. Similarly, the transmitting wireless device may consume a large amount of power transmitting such signals over a higher bandwidth and/or in a directional manner. Such wireless devices consume power in an advanced wireless network by activating or otherwise implementing more advanced (or simply more) hardware components, functional processes, and the like, to support wireless communications over the network.

In some networks, such as a mmW network with relatively small coverage areas and directional transmissions/receptions, such power consumption may be excessive and sometimes unnecessary. For example, a base station deployment in a mmW network may be gradual, which may create a situation where a mmW-configured user equipment (UE) could waste power attempting to detect such signals in an area where no mmW base stations have been deployed. Similarly, a mmW-configured base station may waste power transmitting such signals when there are no mmW-configured UE(s) within its coverage area. That is, the hardware components, functional processes, and the like, utilized in performing and/or attempting to detect transmissions consumes power at the wireless device. Accordingly, aspects of the described techniques provide various mechanisms to reduce or otherwise improve power consumption of a wireless device, such as when the wireless device is operating in an advanced wireless network.

The described techniques provide for the identification and utilization of different power consumption categories by a wireless device in a wireless communications system (e.g., by a UE operating in an advanced wireless network, such as an NR network, 5G network, mmW system, and the like). A power consumption category may correspond to a power consumption level (e.g., a powered circuitry configuration) of the UE. For example, a power consumption category may configure an analog-to-digital conversion (ADC) resolution, a digital-to-analog conversion (DAC) resolution, a number of antennas, etc., that a UE may employ for communications. As such, a set of UE power consumption categories may be established based on the capabilities of the UE to configure (e.g., power, or conversely turn-off) various ADC/DAC circuitry, antenna circuitry (e.g., various antenna elements or antenna sub-arrays), etc.

The described techniques thus provide efficient and dynamic power control by a network (e.g., which may provide for balancing of high power/high performance communications and reduced power communications). For example, UE power consumption categories may be selected or implemented based at least in part on power consumption levels (e.g., power consumption rates) associated with circuitry configurations of the various UE power consumption categories. In some examples, the UE may utilize different power consumption categories for different traffic demands, path loss conditions, types of channels and/or signals to be transmitted and/or received, communication link parameters, capabilities of the wireless device or other wireless devices in the system, etc. The network and/or UE may thus balance the trade-off between more advanced communication needs (e.g., high power/high performance communications) and power consumption (e.g., battery) constraints.

Aspects of the disclosure are initially described in the context of example wireless communications system. Additional aspects of the disclosure are illustrated by and described with reference to apparatus diagrams, system diagrams, and flowcharts that relate to network control and signaling for power circuitry configuration.

FIG. 1 illustrates an example of a wireless communications system 100 that supports network control and signaling for power circuitry configuration in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 (e.g., an NR system) may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources. Shared spectrum may refer to spectrum bands including both licensed spectrum bands and unlicensed spectrum bands, spectrum bands associated with different licensees (shared amongst licensees), etc.

As discussed herein, wireless communications system 100 may, in some cases, refer to a mmW system supporting mmW communications between UEs 115 and base stations 105. To achieve high data rates and meet link budget, mmW systems may utilize high bandwidth and an increased number of antennas for communications (e.g., compared to sub-6 GHz communications systems). Receiver hardware and antenna array (e.g., or antenna sub-array) circuitry for receiving such communications may be associated with high power consumption. For example, powering of device circuitry for high resolution ADC/DAC for reception and transmission of such mmW communications, in addition to powering of a large number of antenna elements for reception and transmission of such mmW communications, may lead to high battery power drainage rates in mmW technology UEs 115.

As such, according to the techniques described herein, a network may specify multiple (e.g., at least two) power consumption categories such that a UE 115 may operate in different modes or configurations that consume different amounts of power (e.g., according to the power consumption category in which the UE 115 is operating). A UE 115 may report supported power consumption categories to the network (e.g., to a base station 105). For example, the UE 115 may transmit an indication of supported power consumption categories from some set of power consumption categories specified by the network. In other examples, the UE 115 may transmit an indication of one or more UE capabilities (e.g., ADC/DAC capabilities, supported antenna configurations, power consumption information associated with various configurations of which the UE is capable, etc.) that may be used by the network to determine a set of power consumption categories that are supported by the UE 115. The network may (e.g., via the base station 105) explicitly control UE 115 switching among the UE's supported power consumption categories or, in some cases, the network may specify conditions (e.g., or thresholds) for UE 115 switching among power consumption categories. Additionally or alternatively, a UE 115 may, in some cases, autonomously switch among power consumption categories (e.g., based on user input of power consumption options, battery status of the UE, a thermal state of the UE, etc.).

Figure 2:
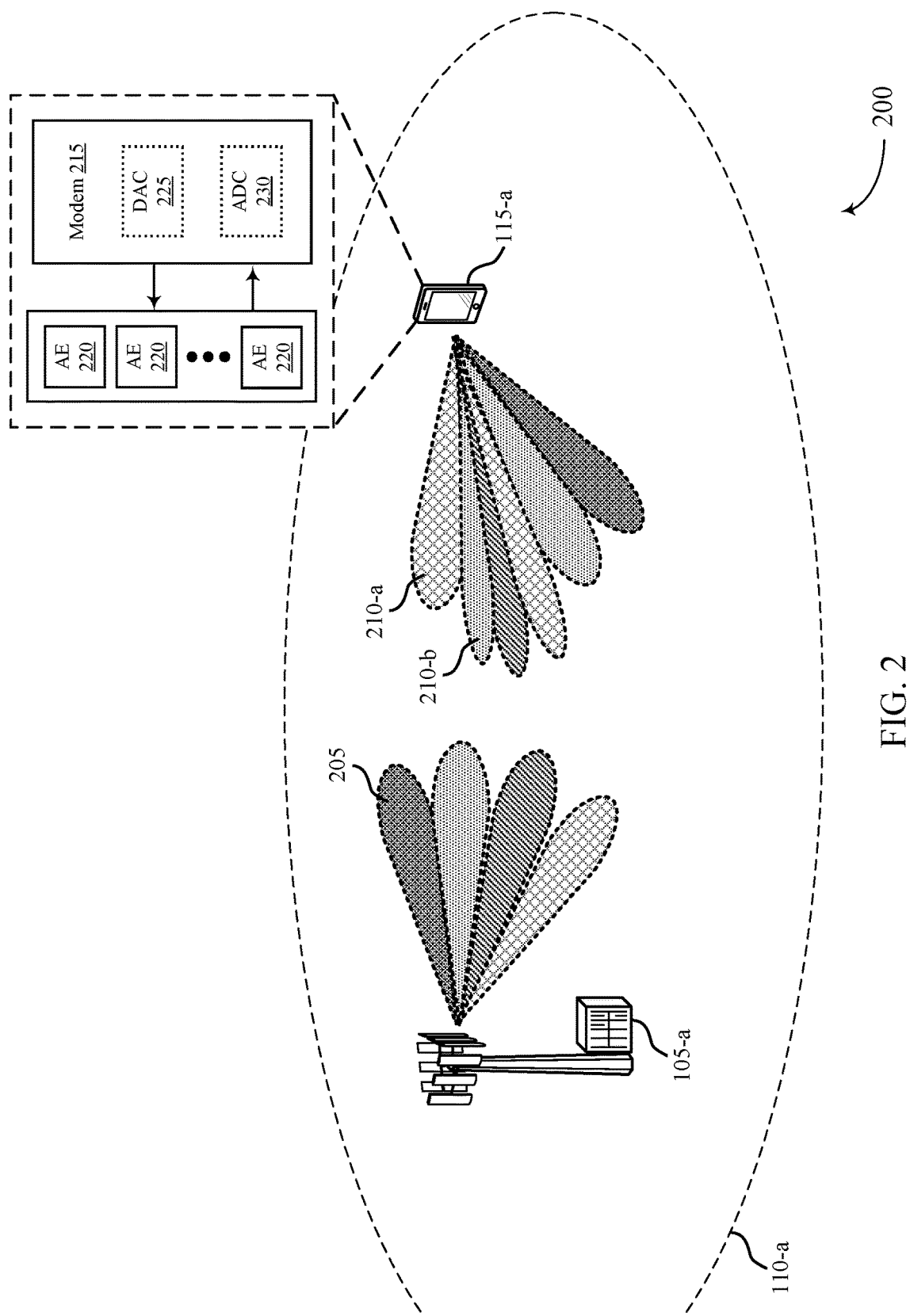
FIG. 2 illustrates an example of a wireless communications system that supports network control and signaling for power circuitry configuration in accordance with aspects of the present disclosure.

FIG. 2 illustrates an example of a wireless communications system 200 that supports network control and signaling for power circuitry configuration in accordance with aspects of the present disclosure. In some examples, wireless communications system 200 may implement aspects of wireless communications system 100. For example, wireless communications system 200 may include a base station 105-a, a UE 115-a, and a geographic coverage area 110-a, which may be an example of aspects of a base station 105, a UE 115, and a geographic coverage area 110 as described with reference to FIG. 1.

Wireless communications system 200 may support network control and signaling for power circuitry configuration. Generally, the described techniques provide for the identification and utilization of different power consumption categories by a wireless device (e.g., UE 115-a or base station 105-a) in the wireless communications system 200. In some cases, wireless communications system 200 may refer to, for example, an advanced wireless network, such as an NR network, a 5G network, a mmW system, and the like. In some examples, UE 115-a may report capability information (e.g., analog/digital processing capabilities, beamforming capabilities, number of antennas, power capabilities or battery storage, power consumption rates at various circuitry configurations, etc.) to base station 105-a, and the base station 105-a may use the capability information to determine a set of UE power consumption categories. In some examples, wireless communications system 200 may configure (e.g., or specify) different power consumption categories, and UE 115-a may report which power consumption categories the UE 115-a is capable of to the base station 105-a.

A power consumption category may correspond to a power consumption level (e.g., a powered circuitry configuration) of the UE 115-a. For example, a power consumption category may configure analog/digital processing (e.g., ADC resolution, a DAC resolution, etc.), a number of antennas, etc., that a UE 115-a may employ for communications. A set of UE power consumption categories may be established based on the capabilities of the UE 115-a to configure (e.g., power, or conversely turn-off) various ADC/DAC circuitry, antenna circuitry (e.g., various antenna elements or antenna sub-arrays), etc. Further, UE power consumption categories may be selected or implemented based at least in part on power consumption levels (e.g., power consumption rates) associated with circuitry configurations of the various UE power consumption categories. In some examples, the UE 115-a may utilize different power consumption categories for different traffic demands, path loss conditions, capabilities of the UE 115-a or other wireless devices in the system, etc. Thus. wireless communications system 200 may balance the trade-off between more advanced communication needs (e.g., higher numbers of antennas, higher ADC/DAC resolution, etc.) and UE power consumption (e.g., battery) constraints.

Based on a received indication of UE 115-a capability information, base station 105-a may explicitly configure UE 115-a with a power consumption category or may configure various thresholds (e.g., or conditions) for power consumption category selection by the UE 115-a. For example, base station 105-a may implicitly configure UE 115-a with a power consumption category (e.g., may configure conditions for which UE 115-a may select certain power consumption categories) based on UE 115-a idle mode signal measurements, based on MCSs used by the UE 115-*a*, based on traffic demands, etc. In other examples, UE 115-*a* may autonomously select power consumption categories. For example, in some cases, UE 115-*a* may autonomously select a power consumption category based on user input, a detected low battery status, a thermal state of the UE 115-*a*, etc.

In the example of FIG. 2, a UE 115-*a* may include a modem 215 in connection (e.g., through various circuitry, digital signal processing components, etc.) with some number of antenna elements (AEs) 220 for beamforming communications. For example, UE 115-*a* may support beamforming techniques for wireless communications, which may allow the UE 115-*a* to transmit and/or receive communications over one or more beams 210. The beamforming techniques may utilize one or more antenna arrays included in the UE 115-*a*. In some cases, at least one antenna array may be used to transmit communications (e.g., via any or some of beams 210) and at least one other antenna array may be used to receive communications (e.g., via any or some of beams 210). In some cases, one or more antenna arrays may be used to transmit and receive communications (e.g., via any or some of beams 210), and some transmit/receive circuitry switch may be associated with the one or more antenna arrays to switch between receiving and transmitting.

For example, UE 115-*a* may generate data (e.g., digital information) for transmission via the modem 215, may pass the digital information signal through a DAC 225, and may use some configuration of antenna elements 220 (e.g., some antenna configuration) for transmission of the analog signal over one or more beams 210. Further, UE 115-*a* may receive a waveform via some configuration of antenna elements 220 (e.g., some antenna configuration), may pass the analog information signal through an ADC 230, and may decode the data (e.g., the converted digital information) via the modem 215.

A modem 215 (e.g., a modulator/demodulator) may process and generate digital baseband signals, control operation of the DAC 225, ADC 230, antenna elements 220, and various other components (e.g., and circuitry) that may be included in UE 115-*a*. In some cases, the modem 215 may process signals and control operation in accordance with network specifications (e.g., a communication standard such as a wireless standard) as discussed herein. In some cases, modem 215 may include a communications manager (e.g., a communications manager 415 or communications manager 515, as described with reference to FIGS. 4 and 5).

A DAC 225 may convert a digital signal (e.g., a digital data stream) into an analog signal (e.g., which may be transmitted according to some antenna configuration). An ADC 230 may convert an analog signal (e.g., which may be received according to some antenna configuration) into a digital signal (e.g., a digital data stream that may be decoded). As such, an ADC process may be modeled as two processes, sampling and quantization. Sampling converts a time-varying voltage signal into a discrete-time signal, a sequence of real numbers. Quantization replaces each real number with an approximation from a finite set of discrete values. Several ADC/DAC architectures may be implemented. The suitability of an ADC/DAC for a particular application may be determined by figures of merit including resolution, maximum sampling frequency, etc. That is, in some cases, ADC/DAC may degrade a signal. As such, ADC/DAC architectures and implementation may be selected such that introduced errors from ADC/DAC processes are insignificant (e.g., non-detrimental) in terms of the application.

For example, quantization error may refer to the difference between the analog signal and the closest available digital value at each sampling instant from the ADC. Quantization error may thus introduce noise, (e.g., quantization noise), to the sample signal. Quantization noise may refer to a rounding error between the analog input voltage to the ADC and the output digitized value. In some cases, the noise may be non-linear and signal-dependent. In some cases, a relationship exists between ADC/DAC resolution (e.g., in bits) and quantization error (e.g., quantization noise expressed in some dB). The higher the resolution of the ADC/DAC, the lower the quantization error and the smaller the quantization noise. That is, higher resolution ADC/DAC (e.g., ADC/DAC with more significant bits, higher sampling rate, etc.) may provide for reduced quantization error.

In some cases, a UE 115-*a* may employ ADC/DAC (e.g., via ADC 230 and DAC 225) with variable resolution. For example, in some cases, a UE 115-*a* may power (e.g., or conversely turn-off) some stages or portions of an ADC/DAC circuit, where each stage may focus on different significant bits (e.g., from a most significant bit (MSB) to a least significant bit (LSB)). As such, UE 115-*a* may be capable of increasing resolution for ADC/DAC by powering additional ADC/DAC circuitry, or conversely may be capable of decreasing resolution for ADC/DAC by turning-off some stages or portions of ADC/DAC circuitry (e.g., as some stages or portions of ADC/DAC circuitry may be responsible for certain bits of the conversion). Additionally or alternatively, in some cases, UE 115-*a* may vary the sampling rate of the ADC/DAC, which may further effect resolution of ADC/DAC. Powering of more stages or portions of ADC/DAC circuitry, as well as powering of higher sampling rates, may thus result in higher resolution ADC/DAC, at the cost of increased power consumption.

The components of UE 115-*a* are shown for exemplary purposes only. The techniques described herein may be applied to various circuitry, hardware configurations, digital signal processing (DSP) techniques, etc., for mmW communications by analogy, without departing from the scope of the present disclosure. For example, in some cases, DAC 225 and ADC 230 may be separately located from the modem 215, the UE 115-*a* may include other radio frequency (RF) circuitry/intermediate frequency (IF) circuitry/baseband circuitry, etc. In addition, the UE 115-*a* may include other mixers, splitters, combiners, amplifiers, phase shifters, etc.

As discussed herein, different classes of operation modes (e.g., different power consumption categories) may consume different amounts of power, as different power consumption categories may use different types of circuitry for communications. Power consumption categories may thus generally refer to various device configurations and/or capabilities (e.g., circuitry, hardware, DSP techniques, etc.) for employing wireless communications (e.g., for mmW communications).

As an example, UE 115-*a* may be capable of a high power consumption category and a low power consumption category. The high power consumption category may use high resolution ADC/DAC (e.g., to reduce quantization error) and use a high number of antennas (e.g., to achieve better beamforming gain). Such a high power consumption category may thus provide for high performance (e.g., high bandwidth, high data rate, high throughput communications), and may consume a relatively large amount of power (e.g., compared to the low power consumption category). The low power consumption category may use low resolution ADC/DAC and a lower number of antennas to reduce circuit power (e.g., and thus UE 115-*a* power consumption), and may be associated with higher quantization error and lower beamforming gain (e.g., compared to UE 115-*a* operation in the high power consumption category).

In this generalized example, the high power consumption category may, for example, be configured (e.g., by base station 105-*a*) or selected (e.g., by UE 115-*a*) for connected mode operation where achieving high signal to noise ratio (SNR) and high throughput may be desirable (e.g., for efficient high-performance connected mode operation). The low power consumption category may, for example, be configured or selected for idle mode operation where the UE 115-*a* may operate at low SNR. For example, the impact of quantization error (e.g., which may result from using lower resolution ADC/DAC) may be more prominent in higher SNR regimes. As such, scenarios (e.g., traffic conditions, QoS requirements, procedures, etc.) employing low MCSs for low SNR channels may use lower resolution ADC/DAC power consumption categories to reduce power consumption without significant impact on communication efficiency in such scenarios.

In some examples, the high power consumption category may implement different receiver algorithms in baseband modem, where more sophisticated (e.g., with increased hardware, circuitry, powering, etc.) detection algorithms may be implemented. The low power consumption category may implement a limited set of receiver algorithms in RF/IF chips where relatively simplified algorithms may be implemented (e.g., with reduced hardware, circuitry, powering, etc., from turned-off portions of modem circuitry).

A network may define (e.g., or specify) any number of different power consumption categories. In some cases, power consumption categories may be specified in terms of power consumption levels (e.g., or power consumption rates), resolutions for ADC/DAC, antenna configurations, beamforming gains, etc. In some cases, UE 115-*a* may report its capabilities (e.g., UE 115-*a* may transmit an indication of UE capability information for a set of power consumption categories to base station 105-*a*). For example, in some cases, UE capability information for a set of power consumption categories may include a set of power consumption categories supported by the UE 115-*a* (e.g., a set of some larger set of network specified power consumption categories, a set of power consumption categories generated by the UE 115-*a* based on its capabilities and known power consumption levels, etc.). Additionally or alternatively, UE capability information for a set of power consumption categories may include resolutions for an ADC/DAC of which the UE 115-*a* is capable, antenna configurations of which the UE 115-*a* is capable, etc., (e.g., the base station may configure power consumption categories based on the received UE capabilities).

In some cases, UE 115-*a* may indicate to the network (e.g., report through physical uplink control channel (PUCCH) or physical uplink shared channel (PUSCH) to base station 105-*a*) which (e.g., or, in some cases, how many) power consumption categories (e.g., how many modes of operation or operation configurations) the UE 115-*a* is capable of supporting. The network may then implicitly convey the conditions for UE 115-*c* selection of different power consumption categories or explicitly inform the UE 115-*c* of a power consumption category through one or more combinations of system information, MAC-control element (CE), RRC signaling, control channel signaling, handover commands, etc.

A power consumption category may be defined for any resolution for ADC/DAC, antenna configuration, RF circuit configuration, IF circuit configuration, baseband circuit configuration, or some combination thereof. For example, in some cases, a power consumption category may be defined for a specific resolution for ADC/DAC and a specific antenna configuration. In other examples, a power consumption category may be defined for some range or set of resolutions for ADC/DAC and some range or set of antenna configurations (e.g., the UE 115-*a* may select a resolution for ADC/DAC and an antenna configuration according to the power consumption category, the UE 115-*a* capabilities, UE 115-*a* power consumption considerations within the options of the power consumption category, etc.).

For example, in some cases, a power consumption category may use a high resolution ADC/DAC and a low number of antennas. In other examples, a power consumption category may use a low resolution ADC/DAC and a high number of antennas (e.g., for initial access where quantization error may not be as much of concern, but higher number of antennas may be used for beamforming gain for the initial access procedure). In general, at low SNR, additive white Gaussian noise (AWGN) may be more prominent than quantization noise arising from quantization error. As such, quantization error may not impact the performance in low SNR (e.g., in channels or communications procedures with low SNR) as much as quantization error may impact high SNR. For example, a UE 115-*a* may be configured with, or may select, power consumption categories corresponding to lower resolution ADC to detect synchronization signals (e.g., with lower power consumption).

In some cases, a wireless device may select a power consumption category based on some signal measurement. For example, UE 115-*a* may select a power consumption category based on receive signal receive power (RSRP), SNR, signal-to-interference-plus-noise ratio (SINR), receive signal receive quality (RSRQ), etc., during detection of idle mode signals. In some cases, idle mode signals may refer to one or more signals including a primary synchronization signal (PSS), a secondary synchronization signal (SSS), a physical broadcast channel (PBCH) transmission, a channel state information reference signal (CSI-RS), a tracking reference signal, a remaining system information (RMSI) transmission, other system information (OSI) transmission, a random access channel (RACH) transmission, a paging physical downlink control channel (PDCCH) transmission, a paging physical downlink shared channel (PDSCH) transmission, or some combination thereof. In some cases, the network may convey or specify the RSRP/SNR/SINR/RSRQ/etc., threshold(s) for selecting various power consumption categories and the UE 115-*a* may select a power consumption category based on its measurements and the network configuration.

In some cases, base station 105-*a* may explicitly configure the UE 115-*a* with a power consumption category (e.g., based on UE 115-*a* reported RSRP/SNR/SINR/RSRQ/etc., measurements). In other examples, a base station 105-*a* may convey RSRP/SNR/SINR/RSRQ/etc., thresholds or conditions to the UE 115-*a* (e.g., based on UE capability information received by the base station 105-*a*), and the UE 115-*a* may select among power consumption categories based on whether the received thresholds have been satisfied, conditions have been met, etc.

For example, as discussed herein, UE 115-*a* may use a power consumption category associated with a lower resolution ADC/DAC in low SNR conditions (e.g., to reduce power consumption without significantly affecting communications performance). A UE 115-*a* may reduce the number of bits used for ADC, which may conserve power in terms of circuitry or components powered by the UE 115-*a* (e.g., compared to utilization of more bits for ADC or higher resolution ADC). As such, the quantization error may increase, however, some SNR condition or threshold may be configured such that the increase in quantization error is negligible. If SNR is measured by the UE 115-*a* to meet such a threshold or condition, the UE 115-*a* may select the power consumption category associated with the lower resolution ADC/DAC in the low SNR conditions. For example, in some cases, idle mode signals may be associated with some error target or performance requirement, but as these idle mode signals may be transmitted (e.g., by base station 105-*a*) under low SNR conditions (e.g., using wide beams), thresholds or conditions for low resolution ADC/DAC power consumption categories may be configured to still meet error targets or performance requirements, while conserving UE power.

Additionally or alternatively, power consumption category configuration or selection may be based at least in part on a modulation and coding scheme (MCS) used for communications (e.g., PDSCH or PUSCH signals). For example, based on the configured MCS, the network may explicitly tell UE 115-*a* to use power consumption categories with high resolution ADC/DAC or low resolution ADC/DAC. In some cases, the network may specify a mapping between different MCS values and different power consumption categories (e.g., the base station 105-*a* may indicate an MCS to power consumption category mapping to the UE 115-*a*, and the UE 115-*a* may select a power consumption category based on the MCS used for communications).

For example, as discussed, use of low resolution ADC/DAC (e.g., which may be associated with reduced UE power consumption) may lead to higher quantization error. As the impact of quantization error may be more pronounced in high SNR regimes, PDSCH/PUSCH with higher MCS and lower MCS may be associated with higher SNR and lower SNR, respectively. In high SNR scenarios, AWGN is low and quantization noise (e.g., from quantization error) may be more impactful. As such, for data channels with high SNR conditions (e.g., used for higher MCS of PDSCH or PUSCH), the network may define that if the MCS is greater than some threshold, or if MCS satisfies some condition, UE 115-*a* is to use a power consumption category with higher resolution ADC/DAC.

Additionally or alternatively, power consumption category configuration or selection may be based at least in part on the thermal state of the UE 115-*a*. For example, in some cases, if the UE 115-*a* heats up at or beyond some threshold (e.g., due to high power consumption, sunlight exposure, etc.), the UE 115-*a* may autonomously select a lower power consumption category (e.g., a power consumption category associated with reduced power consumption compared to a current power consumption category the UE 115-*a* is operating in). Additionally or alternatively, power consumption category configuration or selection may be based at least in part on a battery status of the wireless device. For example, if battery is running low (e.g., either for a UE 115-*a* or a base station 105-*a*), a lower power consumption category may be selected. As discussed herein, power consumption category thresholds or conditions for UE selection of various power consumption categories (e.g., including thermal state threshold, battery status thresholds, etc.) may be configured by the network. In some cases, a UE may autonomously decide when to select various power consumption categories based on its thermal state, battery status, etc.

Additionally or alternatively, power consumption category configuration or selection may be based at least in part on user input (e.g., the end user may directly control power consumption category configuration selection). For example, a user may select from various power consumption categories based on a known next charging opportunity for the UE 115-*a*. For example, in cases where a user knows a next charging opportunity is soon (e.g., within a threshold time period), a user may select a high power consumption category in a low battery status state. Conversely, in cases where a user knows a next charging opportunity may be delayed, extended, etc., the user may select a low power consumption category in a high battery status state. As such, a user may proactively choose between higher performance and battery life.

Additionally or alternatively, power consumption category configuration or selection may be based at least in part on pending applications or QoS. For example, some applications and/or traffic may use high QoS requirements, and may use high power consumption categories. In some cases, other applications may not use high power circuitry, and may use lower power consumption categories (e.g., power consumption categories with low resolution ADC). For example, when a UE is searching for (e.g., trying to connect to) a mmW base station, the UE may use power (e.g., a high power consumption category) to detect the mmW network.

The base station 105-*a* may also support beamforming techniques for wireless communications, which may allow the base station 105-*a* to transmit and/or receive communications over one or more beams 205. The beamforming techniques may utilize one or more antenna arrays included in the base station 105-*a*. In some cases, at least one antenna array may be used to transmit communications (e.g., via any or some of beams 205) and at least one other antenna array may be used to receive communications (e.g., via any or some of beams 205). In some cases, one or more antenna arrays may be used to transmit and receive communications, and some transmit/receive circuitry switch may be associated with the one or more antenna arrays to switch between receiving and transmitting.

A mmW device such as base station 105-*a* or UE 115-*a* may use different beam configurations (e.g., beam-width, number of beams, beam resources, beam gain, etc.) depending on the type of communications with one or multiple other wireless nodes. In some cases, an antenna configuration may refer to a configuration of antenna elements 220 that may be utilized by a wireless device to achieve various beam configurations. For example, in some cases, antenna elements 220 may form an antenna array, and various antenna sub-arrays may be separately controllable by UE 115-*a*. In other examples, antenna elements 220 may form multiple antenna arrays which may be separately controllable by UE 115-*a*. Configurations (e.g., powered or active combinations) of antenna elements, antenna sub-arrays, antenna arrays, or some combination thereof, may be referred to as an antenna configuration. Generally, for example, base station 105-*a* or UE 115-*a* may have a plurality of antennas, where the plurality of antennas may be configured into one or more antenna arrays. In some cases, an antenna configuration may also include various circuitry or hardware associated with the included antenna elements, antenna sub-arrays, or antenna arrays, such as splitters, combiners, amplifiers phase shifters, etc.

As discussed, antenna configurations may be utilized by UE 115-*a* to achieve various beam configurations. Usage of different antenna configurations may be associated with different power consumption by UE 115-*a* (e.g., to power circuitry, hardware, DSP components, etc., associated with different numbers of antennas which, as used herein, may generally refer to antenna elements 220, antenna sub-arrays, antenna arrays, or some combination thereof). For example, in some cases, an antenna configuration may include a high number of antennas (e.g., which, as used herein, may generally refer to antenna elements 220, antenna sub-arrays, antenna arrays, or some combination thereof), which may provide for higher beamforming gain (e.g., and narrower beams, such as beam 210-*b*). In other cases, an antenna configuration may include a relatively lower number of antennas, which may provide for less beamforming gain (e.g., and wider beams, such as beam 210-*a*) yet may provide a larger angular coverage.

The choice of beam configuration (e.g., and thus antenna configuration) may depend on the type of communications or channels scheduled for transmission or reception. For example, some channel types may not require a high link budget (e.g., a communication link performance, such as SNR or SINR, such as channels transmitted using a low MCS, such as a PDCCH or a PUCCH. These channels may be transmitted using wider beams and without maximizing beamforming gains. As such, in these scenarios, power consumption categories associated with a fewer number of transmit antennas may implemented (e.g., by a UE 115-*a*) for power conservation.

Further, a wireless device (e.g., base station 105-*a* or UE 115-*a*) may communicate some signals with wider beams to provide a larger angular coverage (e.g., a control channel, a reference signal (beam or sync), a broadcast channel (e.g., PBCH, RMSI)) to cover multiple target nodes and/or to simplify the beamform (e.g., simplified beam searching techniques, simplified beam steering, and/or simplified beam determination procedures) of the device or the target node(s). In some cases, a control channel may be configured for less link budget (LB), and thus may be transmitted using a wide beam. In these scenarios, power consumption categories associated with a fewer number of transmit antennas may implemented (e.g., by a UE 115-*a*) for power conservation. In other cases, a data channel may be configured for more LB, and thus may be transmitted using a narrow beam which may allow for higher beamforming gain. As such, in these scenarios, power consumption categories associated with a higher number of transmit antennas may be implemented (e.g., by a UE 115-*a*).

A wireless device may also use different beam configurations or antenna configurations based on the state of the wireless device or target node (e.g., a corresponding node a wireless device is transmitting to/receiving from). For example, the beam configuration or antenna configuration may be based on the capabilities of the wireless device or target node (e.g., analog/digital processing capabilities, beamforming capabilities, number of antennas, number of digital chains, beam-correspondence capability). The beam configuration or antenna configuration may additionally or alternatively be based on a location or relative location of the wireless device or the target node (e.g., angular direction or distance, which may correspond to path loss). As described herein, power consumption categories may be configured by base station 105-*a*, selected by UE 115-*a*, etc., based on antenna configurations discussed herein.

Figure 3:
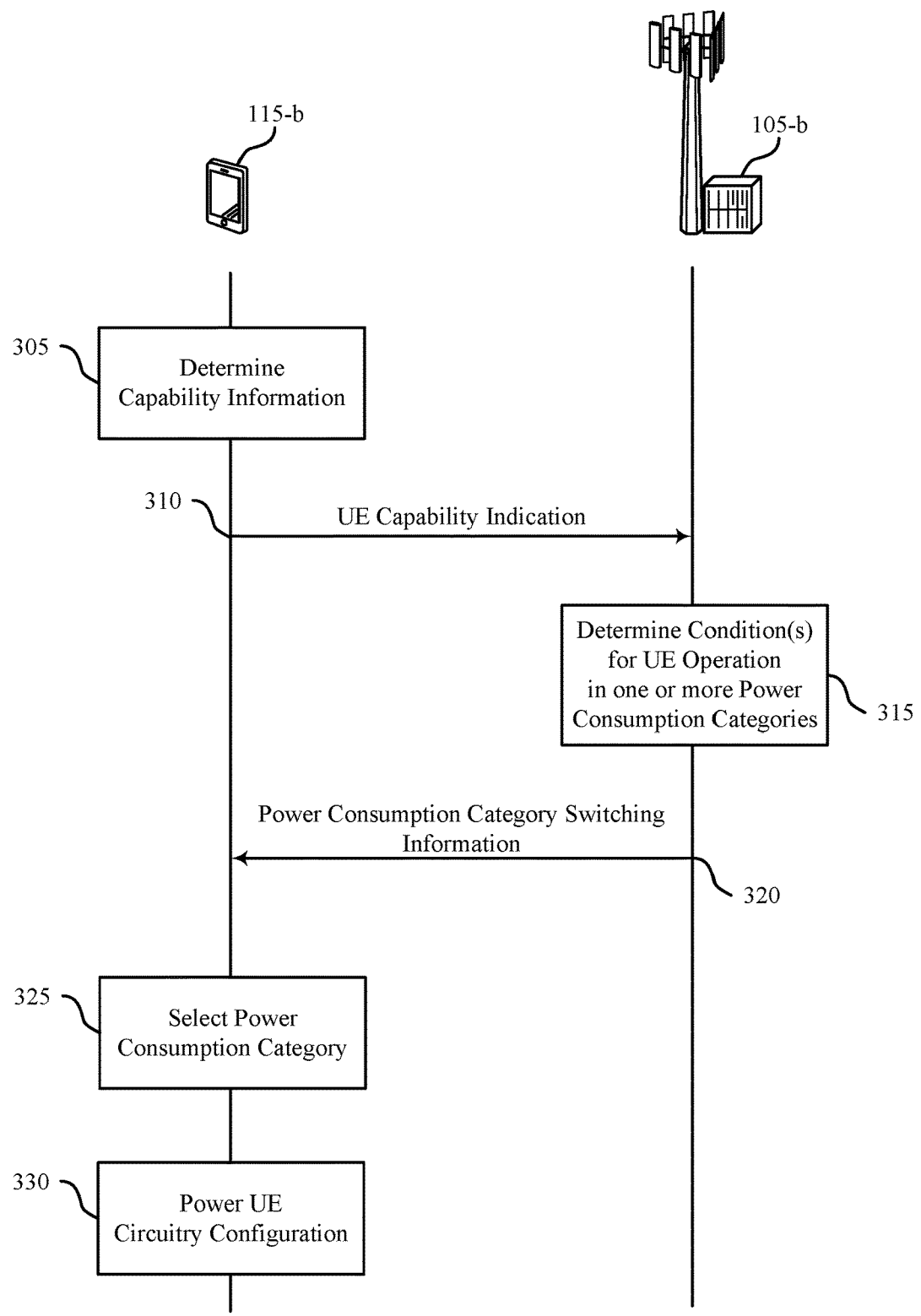
FIG. 3 illustrates an example of a process flow that supports network control and signaling for power circuitry configuration in accordance with aspects of the present disclosure.

FIG. 3 illustrates an example of a process flow 300 that supports network control and signaling for power circuitry configuration in accordance with aspects of the present disclosure. In some examples, process flow 300 may implement aspects of wireless communications system 100 and/or wireless communications system 200. Process flow 300 illustrates aspects of techniques performed by base station 105-*b* and UE 115-*b*, which may be examples of a base station 105 and UE 115 described with reference to FIGS. 1 and 2. In the following description of the process flow 300, the operations between the base station 105-*b* and UE 115-*b* may be transmitted in a different order than the exemplary order shown, or the operations performed by base station 105-*b* and UE 115-*b* may be performed in different orders or at different times. In some cases, certain operations may also be left out of the process flow 300, or other operations may be added to the process flow 300.

At 305, UE 115-*b* may determine UE capability information for a set of UE power consumption categories. For example, each power consumption category of the set of UE power consumption categories may correspond to a resolution for an ADC, a resolution for a DAC, an antenna configuration of the UE 115-*b*, an RF circuit configuration of the UE 115-*b*, an IF circuit configuration of the UE 115-*b*, a baseband circuit configuration of the UE 115-*b*, or some combination thereof.

At 310, UE 115-*b* may transmit an indication of the UE capability information for the set of power consumption categories to base station 105-*b*. In some cases, the UE capability information for the set of power consumption categories may refer to UE capabilities relating to supported resolutions for an ADC, supported resolutions for a DAC, supported antenna configurations of the UE 115-*b*, supported RF circuit configurations of the UE 115-*b*, supported IF circuit configurations of the UE 115-*b*, supported baseband circuit configurations of the UE 115-*b*, or some combination thereof. In other cases, the UE capability information for the set of power consumption categories may refer to power consumption categories supported by the UE 115-*b* (e.g., power consumption categories the UE 115-*b* is capable of out of, for example, some network specified set of power consumption categories).

At 315, base station 105-*b* may determine one or more conditions for UE operation in various power consumption states of the set of power consumption categories (e.g., based at least in part on the indication received at 310). In some examples, determining the one or more conditions for UE operation in various power consumption states may refer to base station 105-*b* determination of the various power consumption category switching information. In other examples, determining the one or more conditions for UE operation in various power consumption states may refer to base station determination to explicitly configure the UE with a power consumption state. That is, in some alternatives, a process flow may consist of 305, 310, and 320, such that a base station 105-*b* may receive UE capability information, and may configure the UE 115-*b* to operate in a power consumption category based on the capability information (e.g., the base station 105-*b* may make power consumption category decisions based on UE capabilities, and power consumption categories may not necessarily be specified by the network).

At 320, base station 105-*b* may transmit, to UE 115-*b*, an indication of power consumption category switching information (e.g., based at least in part on the one or more conditions determined at 315). In some cases, the indication of power consumption category switching information may include explicit configuration of a power consumption category (e.g., an indication of a power consumption category index corresponding to some set of network specified power consumption categories). In other examples, the indication of power consumption category switching information may include one or more of the various thresholds or conditions for UE selection of various power consumption categories, as described herein. For example, power consumption category switching information may include (e.g., for some or all power consumption categories corresponding to UE capabilities) an RSRP threshold, an RSRQ threshold, an SNR threshold, an SINR threshold, a thermal state threshold of the UE, a battery status threshold of the UE, a mapping of one or more QoS requirements to one or more power consumption categories, a mapping of one or more MCSs to one or more power consumption categories, etc.

At 325, UE 115-*b* may select a power consumption category based at least in part on the power consumption category switching information indicated at 320. In some cases, a UE 115-*b* may select a resolution for the ADC, a resolution for the DAC, an antenna configuration, a number of subarrays, a number of antennas, an RF circuit configuration, a UHF circuit configuration, or some combination thereof, based at least in part on the power consumption category selected at 325.

At 330, UE 115-*b* may determine whether to power (e.g., or conversely turn-off) one or more portions of UE circuitry based at least in part on the power consumption category selected at 325. For example, the UE 115-*b* may turn on one or more portions of UE circuitry corresponding to a resolution for the analog-to-digital conversion corresponding to the power consumption category selected at 325, a resolution for the digital-to-analog conversion corresponding to the power consumption category selected at 325, an antenna configuration corresponding to the power consumption category selected at 325, a number of subarrays corresponding to the power consumption category selected at 325, a number of antennas corresponding to the power consumption category selected at 325, a radio frequency circuit configuration corresponding to the power consumption category selected at 325, an intermediate frequency circuit configuration corresponding to the power consumption category selected at 325, or some combination thereof.

Figure 4:
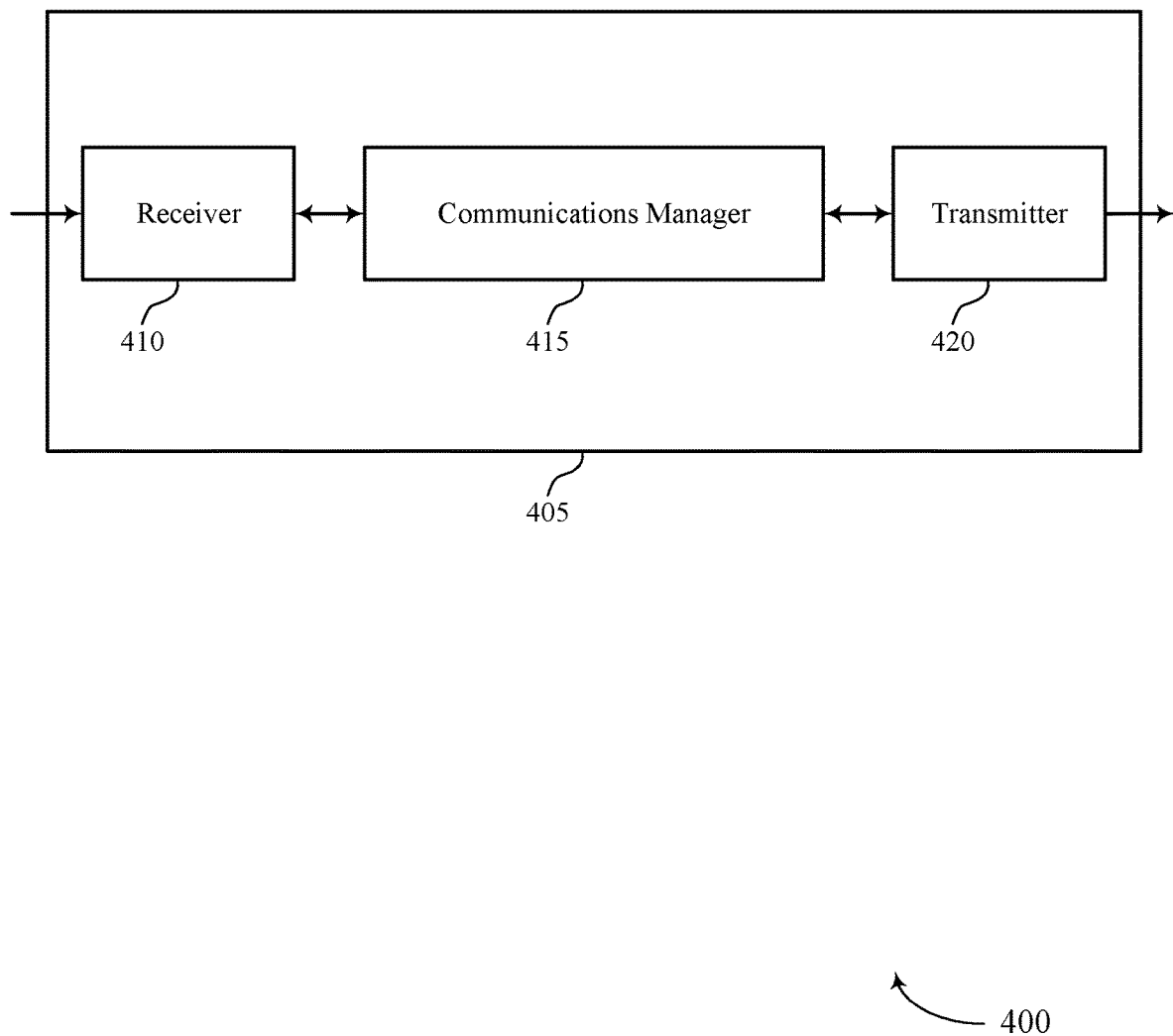
FIGS. 4 and 5 show block diagrams of devices that support network control and signaling for power circuitry configuration in accordance with aspects of the present disclosure.

FIG. 4 shows a block diagram 400 of a device 405 that supports network control and signaling for power circuitry configuration in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to network control and signaling for power circuitry configuration, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof. The communications manager 415 may transmit an indication of the UE capability information for the set of power consumption categories to a base station, and receive an indication of power consumption category switching information in response to the transmitted indication of the UE capability information for the set of power consumption categories.

In cases where the UE autonomously selects a power consumption configuration, the communications manager 415 may determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof. The communications manager 415 may determine a condition for UE operation in a first power consumption category of the set of power consumption categories has been satisfied, and select the first power consumption category of the set of power consumption categories based on the determination that the condition has been satisfied. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
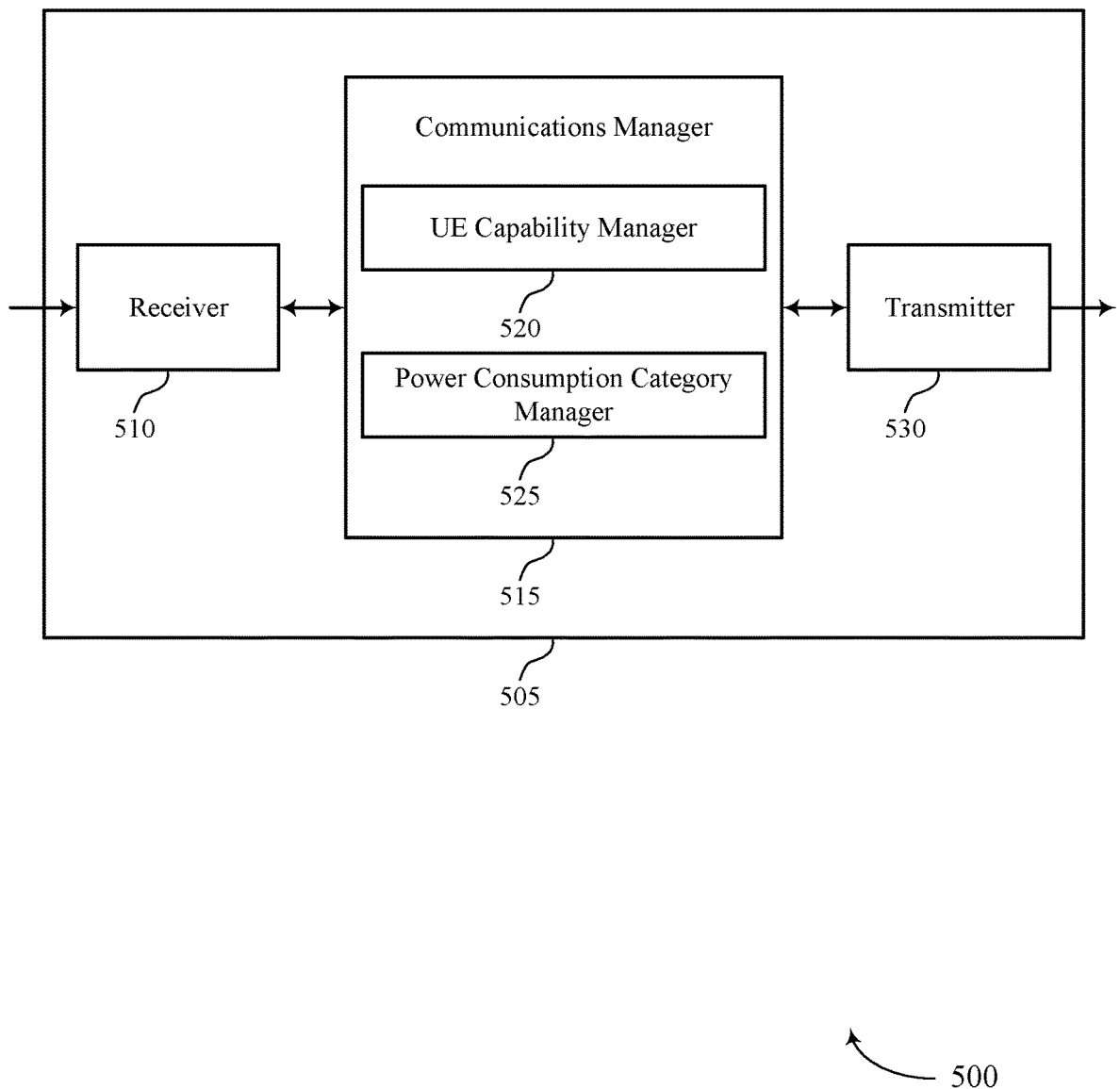

FIG. 5 shows a block diagram 500 of a device 505 that supports network control and signaling for power circuitry configuration in accordance with aspects of the present disclosure. The device 505 may be an example of aspects of a device 405, or a UE 115 as described herein. The device 505 may include a receiver 510, a communications manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to network control and signaling for power circuitry configuration, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a UE capability manager 520 and a power consumption category manager 525. The communications manager 515 may be an example of aspects of the communications manager 710 described herein.

The UE capability manager 520 may determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof and transmit an indication of the UE capability information for the set of power consumption categories to a base station. The power consumption category manager 525 may receive an indication of power consumption category switching information in response to the transmitted indication of the UE capability information for the set of power consumption categories.

The UE capability manager 520 may determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof. The power consumption category manager 525 may determine a condition for UE operation in a first power consumption category of the set of power consumption categories has been satisfied and select the first power consumption category of the set of power consumption categories based on the determination that the condition has been satisfied.

The transmitter 530 may transmit signals generated by other components of the device 505. In some examples, the transmitter 530 may be collocated with a receiver 510 in a transceiver module. For example, the transmitter 530 may be an example of aspects of the transceiver 720 described with reference to FIG. 7. The transmitter 530 may utilize a single antenna or a set of antennas.

Figure 6:
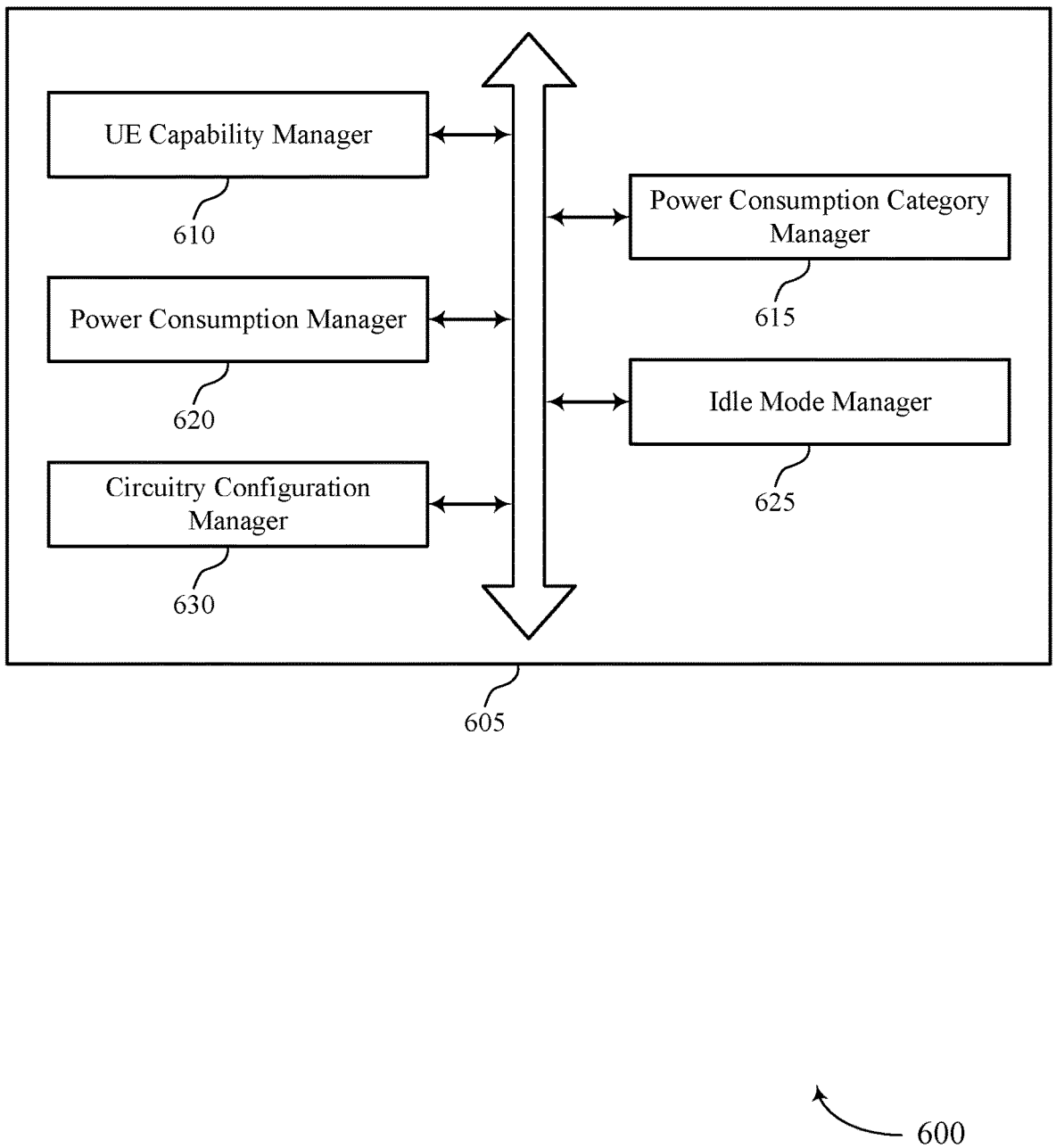
FIG. 6 shows a block diagram of a communications manager that supports network control and signaling for power circuitry configuration in accordance with aspects of the present disclosure.

FIG. 6 shows a block diagram 600 of a communications manager 605 that supports network control and signaling for power circuitry configuration in accordance with aspects of the present disclosure. The communications manager 605 may be an example of aspects of a communications manager 415, a communications manager 515, or a communications manager 710 described herein. The communications manager 605 may include a UE capability manager 610, a power consumption category manager 615, a power consumption manager 620, an idle mode manager 625, and a circuitry configuration manager 630. Each of these modules may communicate, directly or indirectly, with one another (e.g., via one or more buses).

The UE capability manager 610 may determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof. In some examples, the UE capability manager 610 may transmit an indication of the UE capability information for the set of power consumption categories to a base station.

The power consumption category manager 615 may receive an indication of power consumption category switching information in response to the transmitted indication of the UE capability information for the set of power consumption categories. In some examples, the power consumption category manager 615 may receive, from the base station, an indication to switch to a first power consumption category of the set of power consumption categories. In some examples, the power consumption category manager 615 may receive, from the base station, an indication of a threshold for selecting a first power consumption category of the set of power consumption categories.

In some examples, the power consumption category manager 615 may determine the measurement satisfies the threshold. In some examples, the power consumption category manager 615 may select the first power consumption category of the set of power consumption categories based on the determination that the measurement satisfies the threshold. In some examples, the power consumption category manager 615 may determine a thermal state of the UE has satisfied the threshold, a battery status of the UE has satisfied a threshold, or both. In some examples, the power consumption category manager 615 may select the first power consumption category of the set of power consumption categories based on the determination that the thermal state of the UE satisfies the threshold, that the battery status of the UE satisfies the threshold, or both.

In some examples, the power consumption category manager 615 may receive an indication of a quality of service requirement. In some examples, the power consumption category manager 615 may select a first power consumption category of the set of power consumption categories based on the indication of the quality of service requirement. In some examples, the power consumption category manager 615 may receive, from the base station, an indication of a mapping of one or modulation coding schemes to one or more power consumption categories of the set of power consumption categories. In some examples, the power consumption category manager 615 may identify a configuration for a modulation coding scheme. In some examples, the power consumption category manager 615 may select a first power consumption category of the set of power consumption categories based on the configuration for the modulation coding scheme and the mapping.

In some examples, the power consumption category manager 615 may select a first power consumption category of the set of power consumption categories based on the received indication of power consumption category switching information. In some examples, the power consumption category manager 615 may select a first resolution for the analog-to-digital conversion, a first resolution for the digital-to-analog conversion, a first antenna configuration, a number of subarrays, a number of antennas, a first radio frequency circuit configuration, a first intermediate frequency circuit configuration of the UE, or some combination thereof, based on the selected first power consumption category.

In some cases, the threshold for selecting the first power consumption category of the set of power consumption categories includes a reference signal receive power threshold, a reference signal receive quality threshold, a signal-to-noise ratio threshold, a signal-to-noise-plus-interference ratio, or some combination thereof. In some cases, the threshold for selecting the first power consumption category of the set of power consumption categories includes a thermal state threshold of the UE, a battery status threshold of the UE, or some combination thereof.

In some cases, the indication of the set of power consumption categories includes the resolution for the analog-to-digital conversion for each power consumption category, the resolution for the digital-to-analog conversion for each power consumption category, the antenna configuration of the UE for each power consumption category, the radio frequency circuit configuration of the UE for each power consumption category, the intermediate frequency circuit configuration of the UE for each power consumption category, the baseband circuit configuration of the UE for each power consumption category, or some combination thereof.

The power consumption manager 620 may determine a power consumption level for each power consumption category based on modem radio frequency circuitry associated with the resolution for the analog-to-digital conversion, modem radio frequency circuitry associated with the resolution for the digital-to-analog conversion, circuitry associated with the antenna configuration, circuitry associated with the radio frequency circuit configuration, circuitry associated with the intermediate frequency circuitry configuration, circuitry associated with the baseband circuit configuration, or some combination thereof.

In some cases, the indication of the UE capability information for the set of power consumption categories includes the power consumption level for each power consumption category.

The idle mode manager 625 may measure one or more signals from the base station. In some cases, the one or more signals include a primary synchronization signal, a secondary synchronization signal, a physical broadcast channel transmission, a channel state information reference signal, a tracking reference signal, a remaining system information transmission, other system information transmission, a random access channel transmission, a paging physical downlink control channel transmission, a paging physical downlink shared channel transmission, or some combination thereof. In some cases, the UE uses the one or more signals during idle mode operation.

The circuitry configuration manager 630 may determine whether to turn on one or more portions of UE circuitry corresponding to the selected first resolution for the analog-to-digital conversion, the selected first resolution for the digital-to-analog conversion, the selected first antenna configuration, the selected number of subarrays, the selected number of antennas, the selected first radio frequency circuit configuration, the selected first intermediate frequency circuit configuration of the UE, or some combination thereof.

In examples where the UE may autonomously select a power consumption category, the UE capability manager 610 may determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof. In some examples, the power consumption category manager 615 may determine a condition for UE operation in a first power consumption category of the set of power consumption categories has been satisfied. In some examples, the power consumption category manager 615 may select the first power consumption category of the set of power consumption categories based on the determination that the condition has been satisfied.

In some examples, the power consumption category manager 615 may receive a user input selection of the first power consumption category of the set of power consumption categories, where the determination that the condition has been satisfied is based on the received user input selection. In some examples, the power consumption category manager 615 may determine a thermal state of the UE has exceeded a thermal state threshold, a battery status of the UE has exceeded a battery status threshold, or both, where the determination that the condition has been satisfied is based on the determination that the thermal state of the UE exceeds the thermal state threshold, that the battery status of the UE exceeds the battery status threshold, or both. In some examples, the power consumption category manager 615 may select a first resolution for the analog-to-digital conversion, a first resolution for the digital-to-analog conversion, a first antenna configuration, a number of subarrays, a number of antennas, a first radio frequency circuit configuration, a first intermediate frequency circuit configuration of the UE, or some combination thereof, based on the selected first power consumption category.

In some examples, the circuitry configuration manager 630 may determine whether to turn on one or more portions of UE circuitry corresponding to the selected first resolution for the analog-to-digital conversion, the selected first resolution for the digital-to-analog conversion, the selected first antenna configuration, the selected number of subarrays, the selected number of antennas, the selected first radio frequency circuit configuration, the selected first intermediate frequency circuit configuration of the UE, or some combination thereof.

Figure 7:
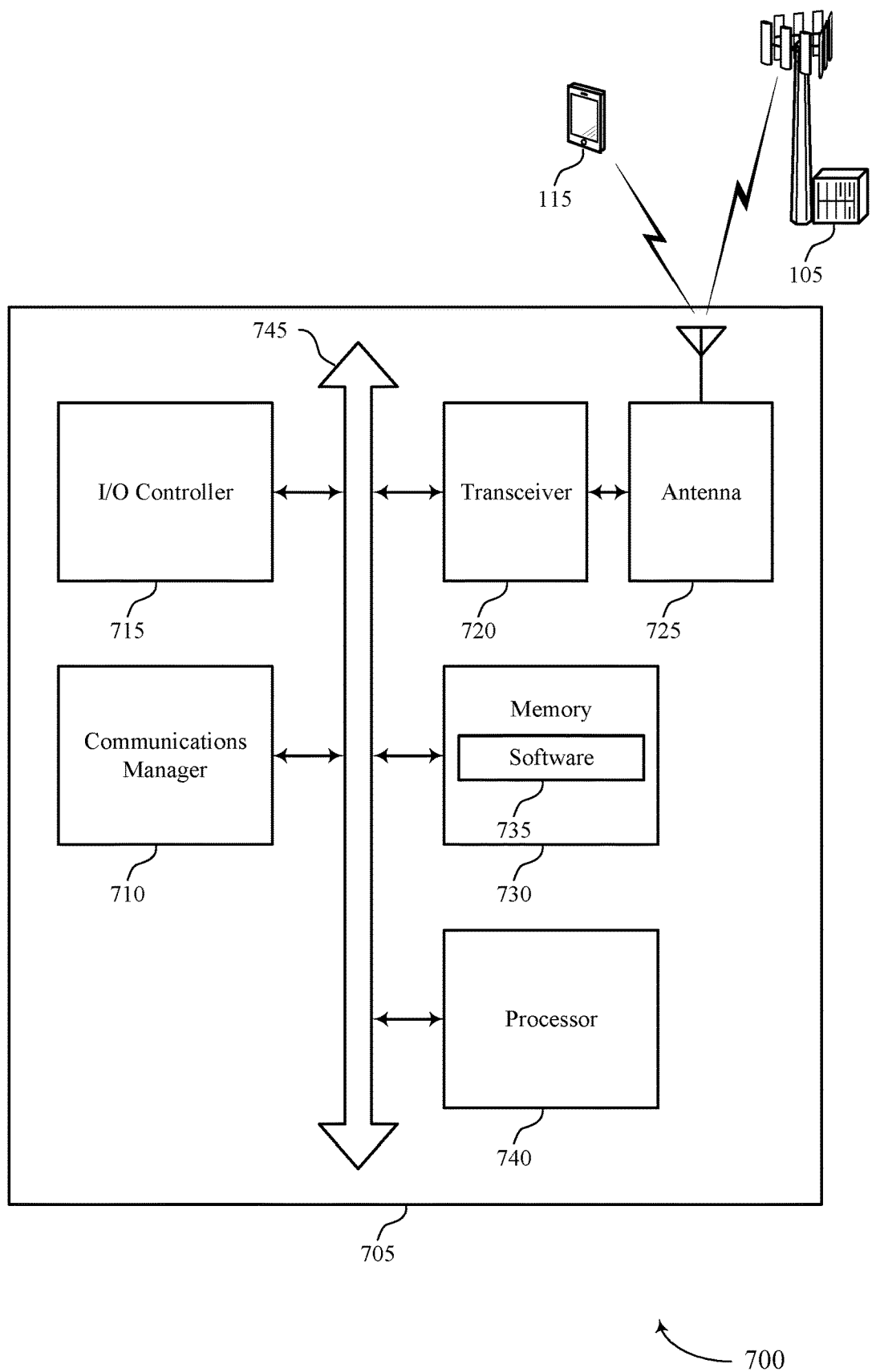
FIG. 7 shows a diagram of a system including a device that supports network control and signaling for power circuitry configuration in accordance with aspects of the present disclosure.

FIG. 7 shows a diagram of a system 700 including a device 705 that supports network control and signaling for power circuitry configuration in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof. The communications manager 710 may transmit an indication of the UE capability information for the set of power consumption categories to a base station, and receive an indication of power consumption category switching information in response to the transmitted indication of the UE capability information for the set of power consumption categories.

In examples where the UE may autonomously select a power consumption category, the communications manager 710 may determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof, determine a condition for UE operation in a first power consumption category of the set of power consumption categories has been satisfied, and select the first power consumption category of the set of power consumption categories based on the determination that the condition has been satisfied. The actions performed by the communications manager 710 as described herein may be implemented to realize one or more potential advantages. One implementation may allow a UE to quickly and efficiently operate in an appropriate power consumption category. For example, a UE may determine a capability and indicate the capability to the base station to communicate in a power efficient manner. Additionally, switching information provided by the base station 105 may enable a UE to reconfigure power settings. Using this information, the UE 115 may save time and power resources by operating in an appropriate power consumption category.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases, the device may have more than one antenna 725, which may be capable of concurrently transmitting or receiving multiple wireless transmissions.

The memory 730 may include random access memory (RAM) and read only memory (ROM). The memory 730 may store computer-readable, computer-executable code or software 735 including instructions that, when executed, cause the processor to perform various functions described herein. In some cases, the memory 730 may contain, among other things, a basic input/basic output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting network control and signaling for power circuitry configuration). The processor 740 may efficiently determine a UE capability as it relates to a power consumption category. Further, the processor 740 may transmit an indication of the capability to a base station. The processor 740 may turn on one or more processing units for receiving an indication of power consumption category switching information from the base station in response to the transmitted indication. As such, when the switching information is received, the processor may be ready to operate more efficiently through the new power consumption category indicated.

The software 735 may include instructions to implement aspects of the present disclosure, including instructions to support wireless communications. The software 735 may be stored in a non-transitory computer-readable medium such as system memory or other type of memory. In some cases, the software 735 may not be directly executable by the processor 740 but may cause a computer (e.g., when compiled and executed) to perform functions described herein.

Figure 8:
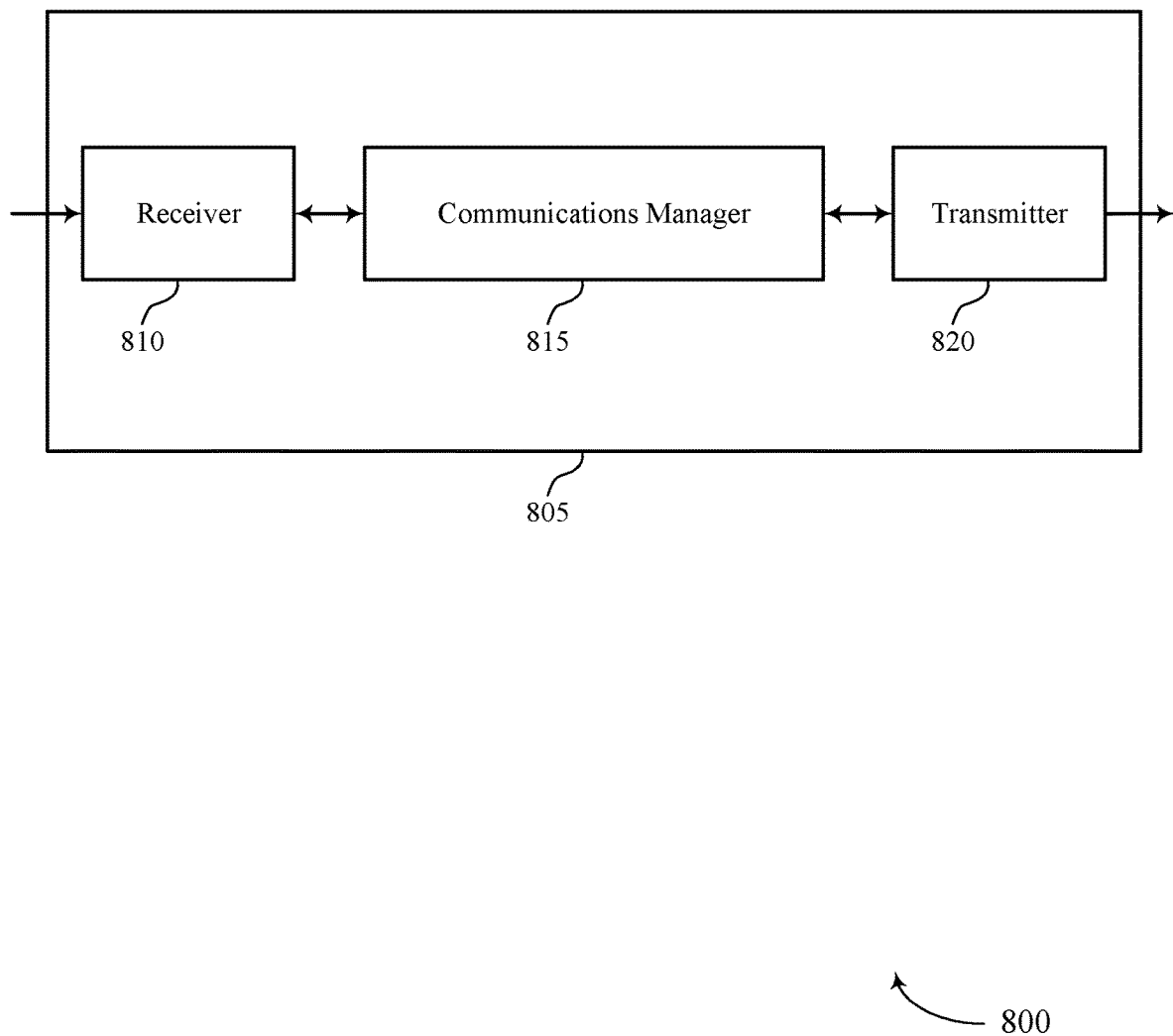
FIGS. 8 and 9 show block diagrams of devices that support network control and signaling for power circuitry configuration in accordance with aspects of the present disclosure.

FIG. 8 shows a block diagram 800 of a device 805 that supports network control and signaling for power circuitry configuration in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to network control and signaling for power circuitry configuration, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive an indication of UE capability information for a set of power consumption categories for the UE, determine a condition for UE operation in a first power consumption category of the set of power consumption categories, and transmit, to the UE, an indication of power consumption category switching information based on the determined condition. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
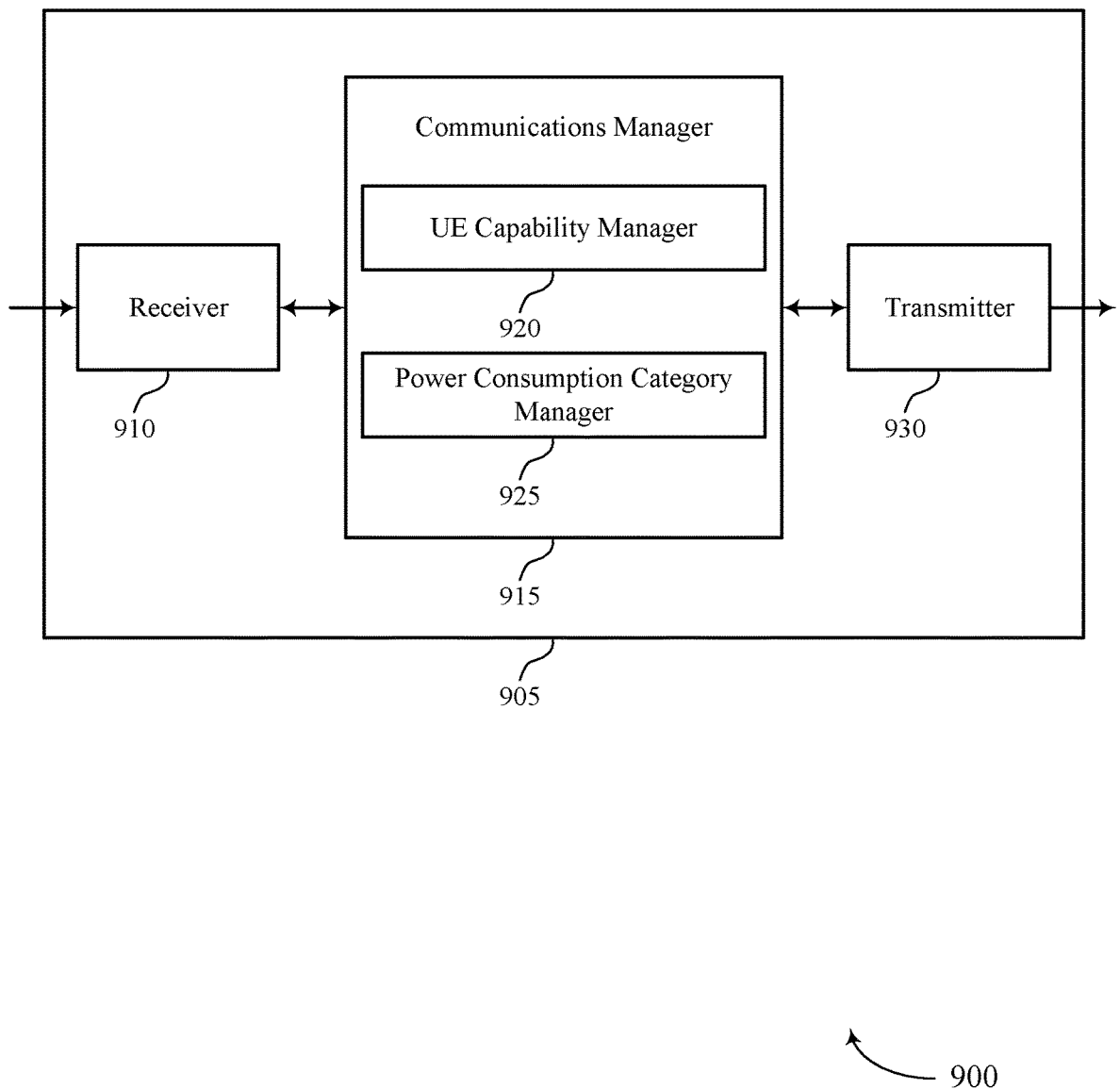

FIG. 9 shows a block diagram 900 of a device 905 that supports network control and signaling for power circuitry configuration in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to network control and signaling for power circuitry configuration, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a UE capability manager 920 and a power consumption category manager 925. The communications manager 915 may be an example of aspects of the communications manager 1110 described herein.

The UE capability manager 920 may receive an indication of UE capability information for a set of power consumption categories for the UE. The power consumption category manager 925 may determine a condition for UE operation in a first power consumption category of the set of power consumption categories and transmit, to the UE, an indication of power consumption category switching information based on the determined condition.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
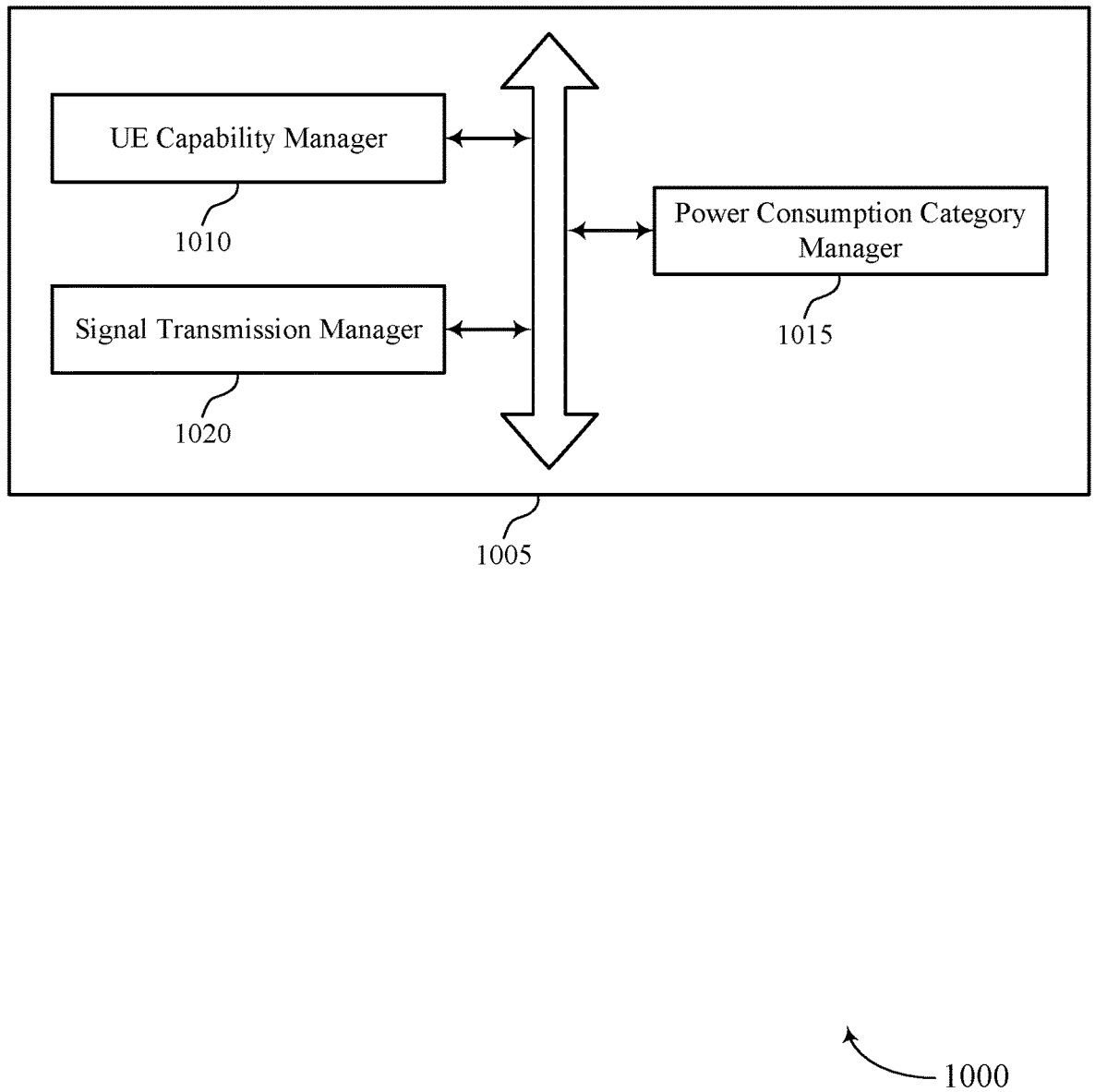
FIG. 10 shows a block diagram of a communications manager that supports network control and signaling for power circuitry configuration in accordance with aspects of the present disclosure.

FIG. 10 shows a block diagram 1000 of a communications manager 1005 that supports network control and signaling for power circuitry configuration in accordance with aspects of the present disclosure. The communications manager 1005 may be an example of aspects of a communications manager 815, a communications manager 915, or a communications manager 1110 described herein. The communications manager 1005 may include a UE capability manager 1010, a power consumption category manager 1015, and a signal transmission manager 1020. Each of these modules may communicate, directly or indirectly, with one another (e.g., via one or more buses).

The UE capability manager 1010 may receive an indication of UE capability information for a set of power consumption categories for the UE. In some examples, the UE capability manager 1010 may determine the UE is capable of operating in the first power consumption category based on the received indication of UE capability information. The power consumption category manager 1015 may determine the condition has been satisfied, where the indication of power consumption category switching information includes an indication of the first power consumption category based on the determination that the condition for UE operation in the first power consumption category has been satisfied.

The power consumption category manager 1015 may determine a condition for UE operation in a first power consumption category of the set of power consumption categories. In some examples, the power consumption category manager 1015 may transmit, to the UE, an indication of power consumption category switching information based on the determined condition. In some examples, the power consumption category manager 1015 may identify, based on the received indication, a power consumption level for each power consumption category of the set of power consumption categories, a resolution for an analog-to-digital conversion for each power consumption category of the set of power consumption categories, a resolution for a digital-to-analog conversion for each power consumption category of the set of power consumption categories, an antenna configuration of the UE for each power consumption category of the set of power consumption categories, a radio frequency circuit configuration of the UE for each power consumption category of the set of power consumption categories, an intermediate frequency circuit configuration of the UE for each power consumption category of the set of power consumption categories, a baseband circuit configuration of the UE for each power consumption category of the set of power consumption categories, or some combination thereof, where the condition is determined based on the identifying.

In some examples, the power consumption category manager 1015 may determine, for each of one or more power consumption categories of the set of power consumption categories, a reference signal receive power threshold, a reference signal receive quality threshold, a signal-to-noise ratio threshold, a signal-to-noise-plus-interference ratio, or some combination thereof. In some examples, the power consumption category manager 1015 may determine a thermal state threshold of the UE, a battery status threshold of the UE, or some combination thereof. In some examples, determining a mapping of one or more quality of service requirements to one or more power consumption categories of the set of power consumption categories, where the power consumption category switching information includes the mapping. In some examples, the power consumption category manager 1015 may transmit an indication of a quality of service requirement to the UE.

In some examples, determining a mapping of one or more modulation coding schemes to one or more power consumption categories of the set of power consumption categories, where the power consumption category switching information includes the mapping. In some cases, the indication of power consumption category switching information includes the determined condition.

The signal transmission manager 1020 may transmit one or more signals including a primary synchronization signal, a secondary synchronization signal, a physical broadcast channel transmission, a remaining system information transmission, other system information transmission, a random access channel transmission, a paging physical downlink control channel transmission, a paging physical downlink shared channel transmission, or some combination thereof, where the condition for UE operation in the first power consumption category is based on the transmitted one or more signals.

Figure 11:
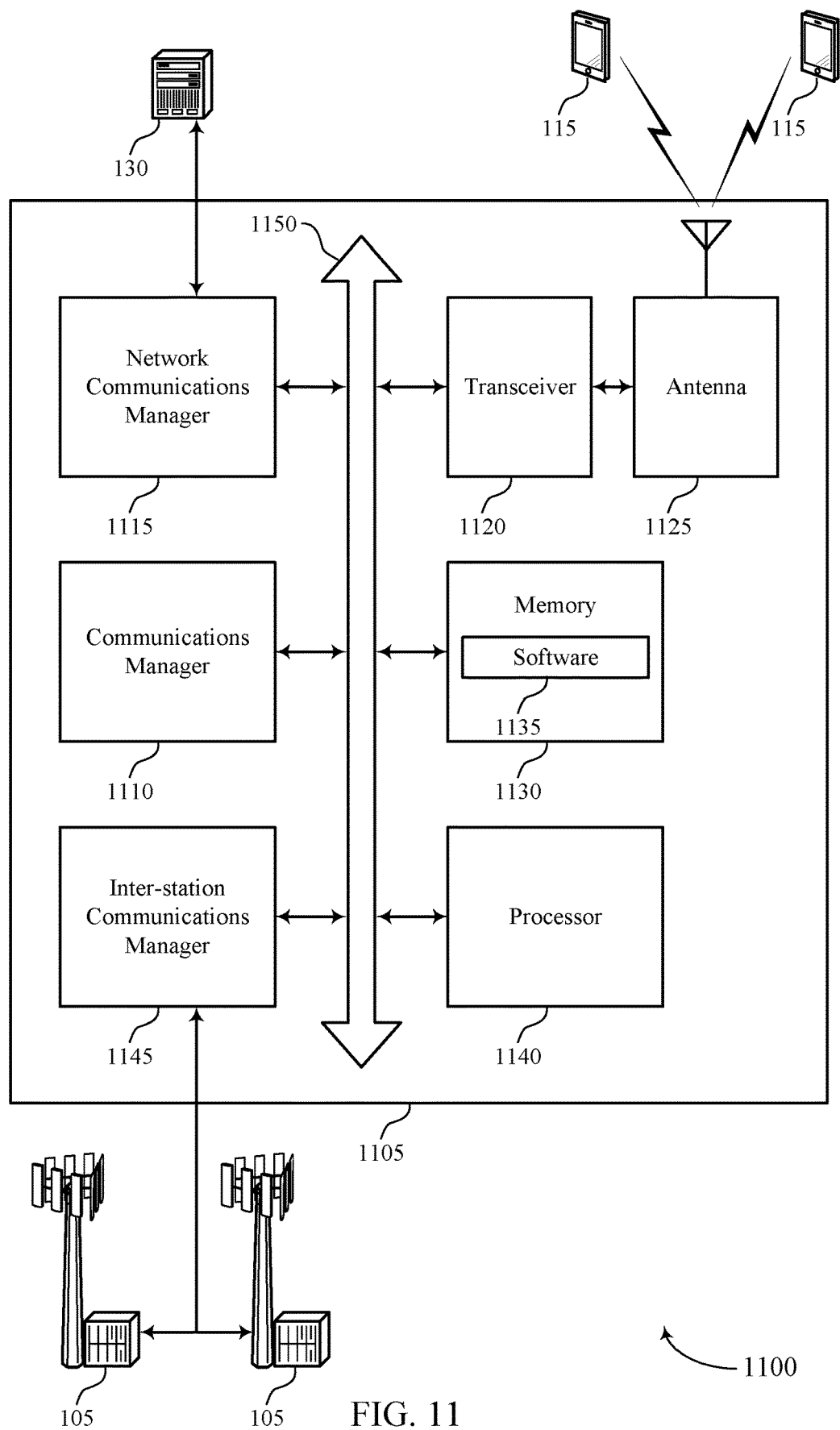
FIG. 11 shows a diagram of a system including a device that supports network control and signaling for power circuitry configuration in accordance with aspects of the present disclosure.

FIG. 11 shows a diagram of a system 1100 including a device 1105 that supports network control and signaling for power circuitry configuration in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive an indication of UE capability information for a set of power consumption categories for the UE, determine a condition for UE operation in a first power consumption category of the set of power consumption categories, and transmit, to the UE, an indication of power consumption category switching information based on the determined condition.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases, the device may have more than one antenna 1125, which may be capable of concurrently transmitting or receiving multiple wireless transmissions.

The memory 1130 may include RAM, ROM, or a combination thereof. The memory 1130 may store computer-readable code or software 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting network control and signaling for power circuitry configuration).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
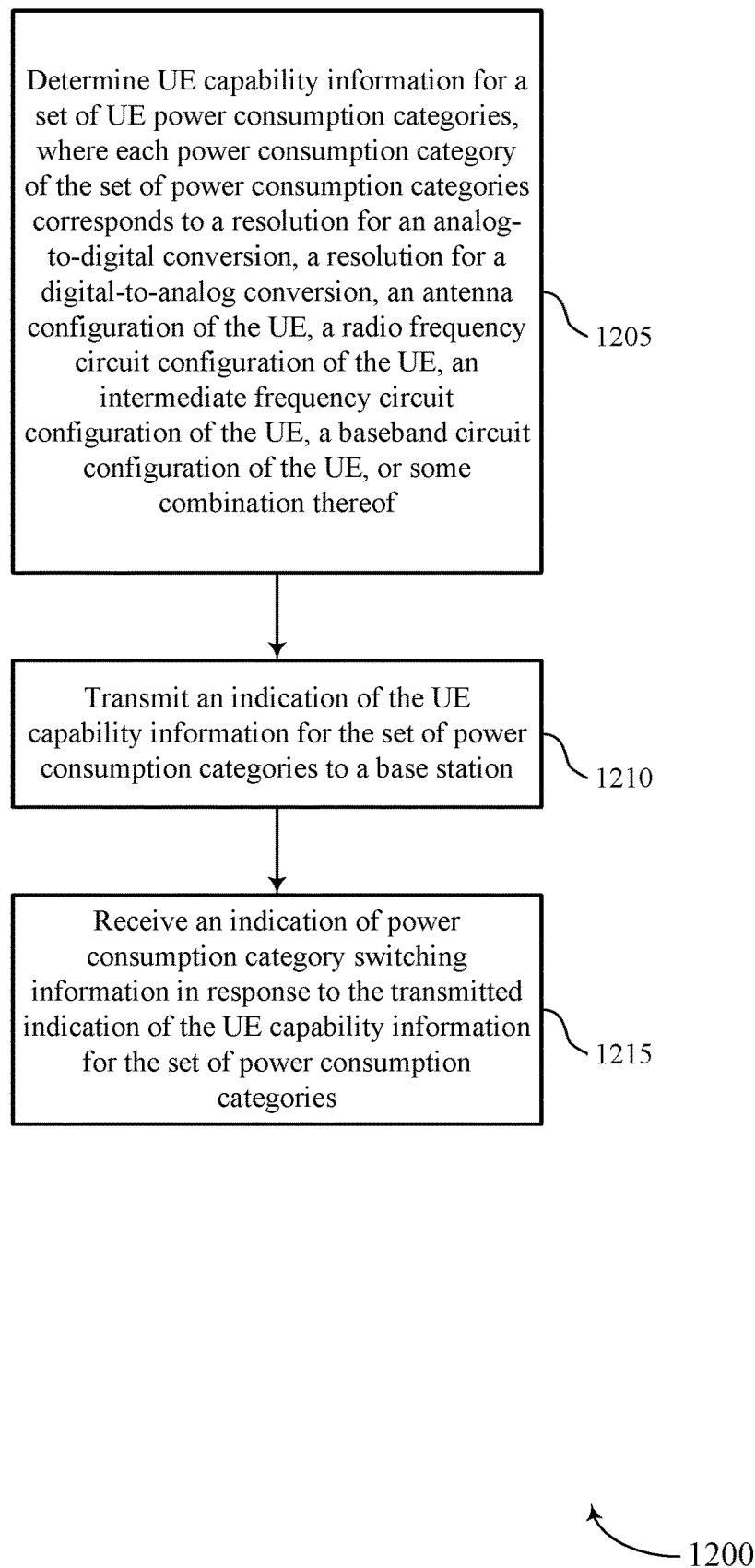
FIGS. 12 through 16 show flowcharts illustrating methods that support network control and signaling for power circuitry configuration in accordance with aspects of the present disclosure.

FIG. 12 shows a flowchart illustrating a method 1200 that supports network control and signaling for power circuitry configuration in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof. The operations of 1205 may be performed according to the methods described herein. In some examples, aspects of the operations of 1205 may be performed by a UE capability manager as described with reference to FIGS. 4 through 7.

At 1210, the UE may transmit an indication of the UE capability information for the set of power consumption categories to a base station. The operations of 1210 may be performed according to the methods described herein. In some examples, aspects of the operations of 1210 may be performed by a UE capability manager as described with reference to FIGS. 4 through 7.

At 1215, the UE may receive an indication of power consumption category switching information in response to the transmitted indication of the UE capability information for the set of power consumption categories. The operations of 1215 may be performed according to the methods described herein. In some examples, aspects of the operations of 1215 may be performed by a power consumption category manager as described with reference to FIGS. 4 through 7.

Figure 13:
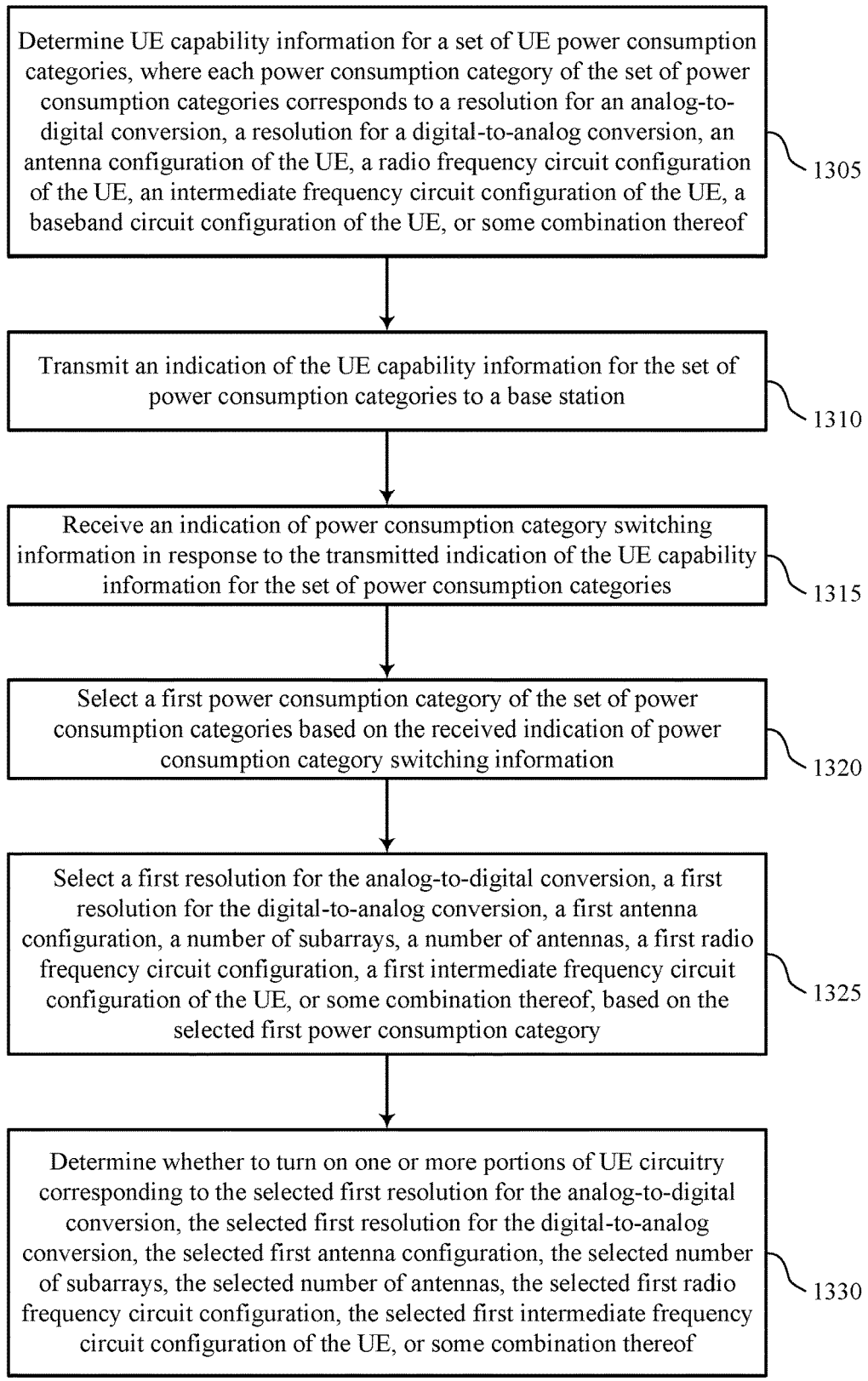

FIG. 13 shows a flowchart illustrating a method 1300 that supports network control and signaling for power circuitry configuration in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof. The operations of 1305 may be performed according to the methods described herein. In some examples, aspects of the operations of 1305 may be performed by a UE capability manager as described with reference to FIGS. 4 through 7.

At 1310, the UE may transmit an indication of the UE capability information for the set of power consumption categories to a base station. The operations of 1310 may be performed according to the methods described herein. In some examples, aspects of the operations of 1310 may be performed by a UE capability manager as described with reference to FIGS. 4 through 7.

At 1315, the UE may receive an indication of power consumption category switching information in response to the transmitted indication of the UE capability information for the set of power consumption categories. The operations of 1315 may be performed according to the methods described herein. In some examples, aspects of the operations of 1315 may be performed by a power consumption category manager as described with reference to FIGS. 4 through 7.

At 1320, the UE may select a first power consumption category of the set of power consumption categories based on the received indication of power consumption category switching information. The operations of 1320 may be performed according to the methods described herein. In some examples, aspects of the operations of 1320 may be performed by a power consumption category manager as described with reference to FIGS. 4 through 7.

At 1325, the UE may select a first resolution for the analog-to-digital conversion, a first resolution for the digital-to-analog conversion, a first antenna configuration, a number of subarrays, a number of antennas, a first radio frequency circuit configuration, a first intermediate frequency circuit configuration of the UE, or some combination thereof, based on the selected first power consumption category. The operations of 1325 may be performed according to the methods described herein. In some examples, aspects of the operations of 1325 may be performed by a power consumption category manager as described with reference to FIGS. 4 through 7.

At 1330, the UE may determine whether to turn on one or more portions of UE circuitry corresponding to the selected first resolution for the analog-to-digital conversion, the selected first resolution for the digital-to-analog conversion, the selected first antenna configuration, the selected number of subarrays, the selected number of antennas, the selected first radio frequency circuit configuration, the selected first intermediate frequency circuit configuration of the UE, or some combination thereof. The operations of 1330 may be performed according to the methods described herein. In some examples, aspects of the operations of 1330 may be performed by a circuitry configuration manager as described with reference to FIGS. 4 through 7.

Figure 14:
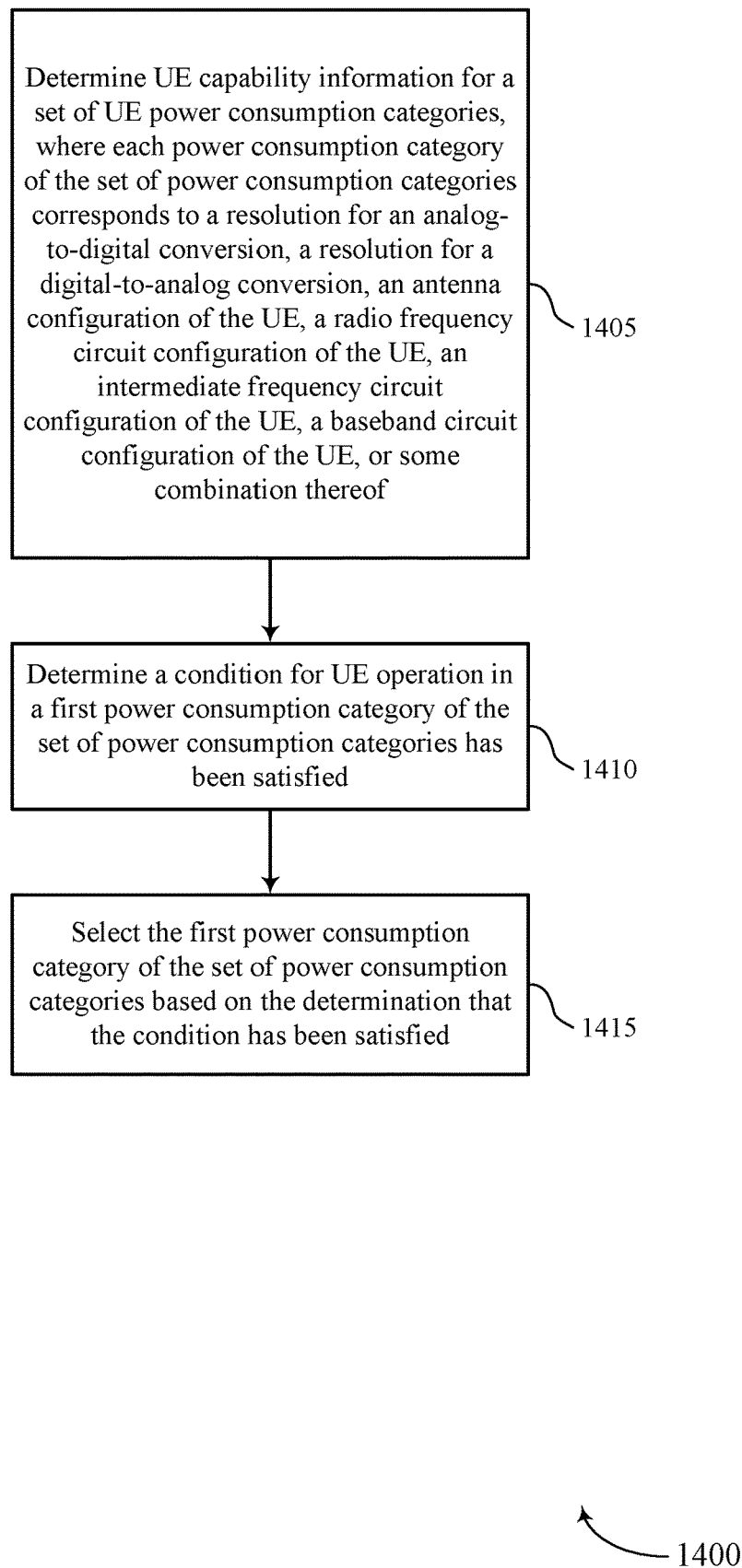

FIG. 14 shows a flowchart illustrating a method 1400 that supports network control and signaling for power circuitry configuration in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may determine UE capability information for a set of UE power consumption categories, where each power consumption category of the set of power consumption categories corresponds to a resolution for an analog-to-digital conversion, a resolution for a digital-to-analog conversion, an antenna configuration of the UE, a radio frequency circuit configuration of the UE, an intermediate frequency circuit configuration of the UE, a baseband circuit configuration of the UE, or some combination thereof. The operations of 1405 may be performed according to the methods described herein. In some examples, aspects of the operations of 1405 may be performed by a UE capability manager as described with reference to FIGS. 4 through 7.

At 1410, the UE may determine a condition for UE operation in a first power consumption category of the set of power consumption categories has been satisfied. The operations of 1410 may be performed according to the methods described herein. In some examples, aspects of the operations of 1410 may be performed by a power consumption category manager as described with reference to FIGS. 4 through 7.

At 1415, the UE may select the first power consumption category of the set of power consumption categories based on the determination that the condition has been satisfied. The operations of 1415 may be performed according to the methods described herein. In some examples, aspects of the operations of 1415 may be performed by a power consumption category manager as described with reference to FIGS. 4 through 7.

Figure 15:
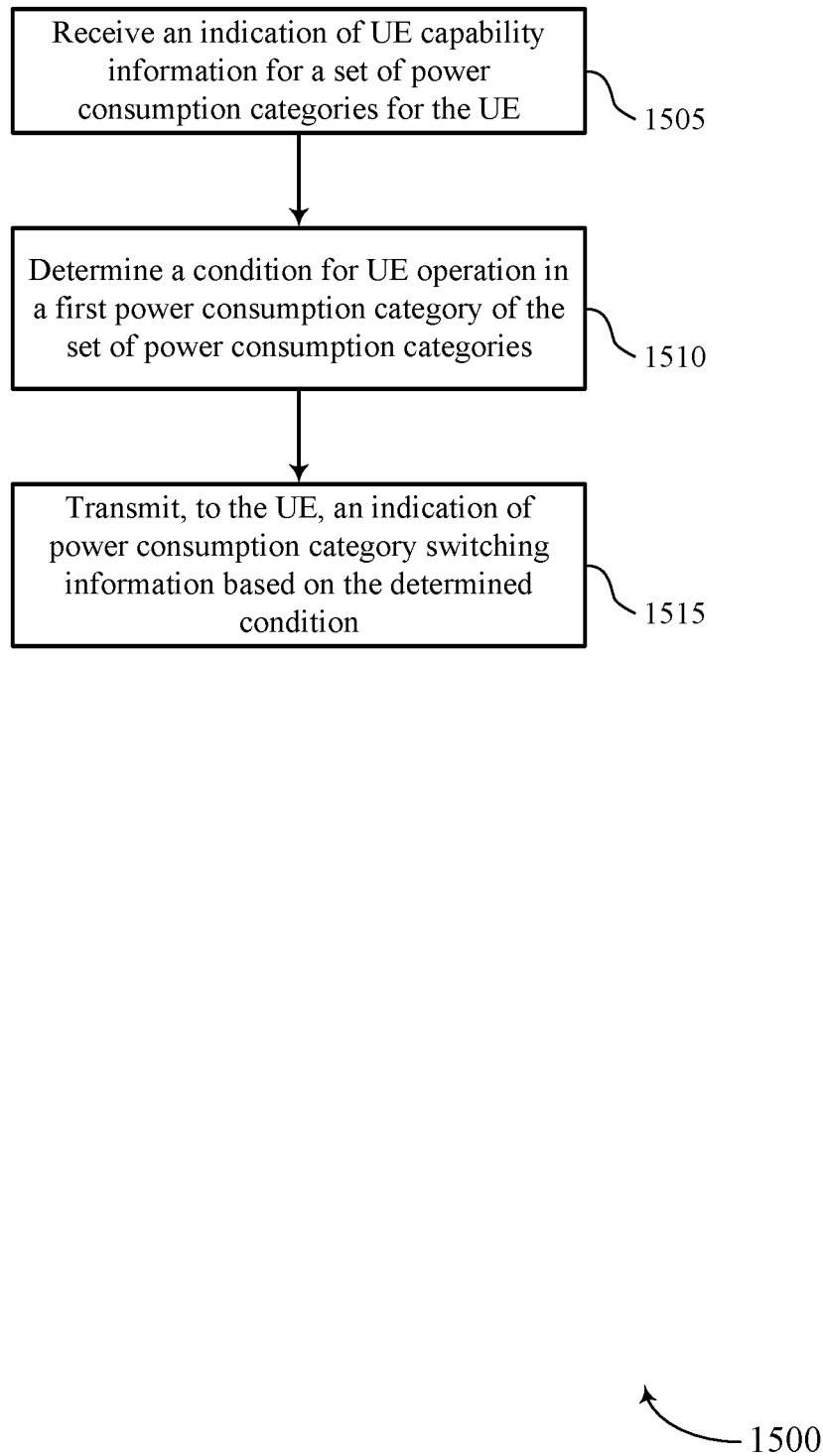

FIG. 15 shows a flowchart illustrating a method 1500 that supports network control and signaling for power circuitry configuration in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may receive an indication of UE capability information for a set of power consumption categories for the UE. The operations of 1505 may be performed according to the methods described herein. In some examples, aspects of the operations of 1505 may be performed by a UE capability manager as described with reference to FIGS. 8 through 11.

At 1510, the base station may determine a condition for UE operation in a first power consumption category of the set of power consumption categories. The operations of 1510 may be performed according to the methods described herein. In some examples, aspects of the operations of 1510 may be performed by a power consumption category manager as described with reference to FIGS. 8 through 11.

At 1515, the base station may transmit, to the UE, an indication of power consumption category switching information based on the determined condition. The operations of 1515 may be performed according to the methods described herein. In some examples, aspects of the operations of 1515 may be performed by a power consumption category manager as described with reference to FIGS. 8 through 11.

Figure 16:
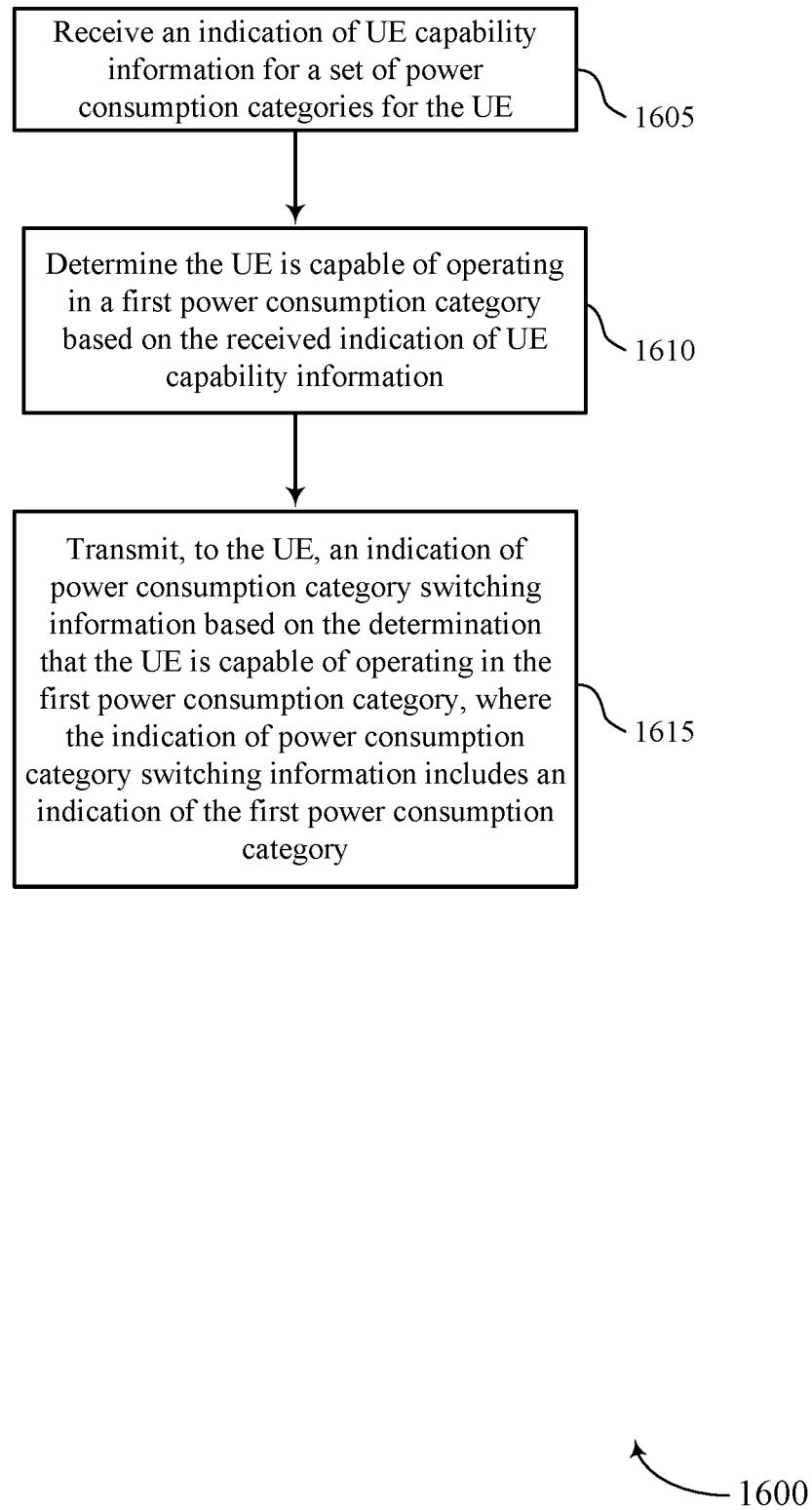

FIG. 16 shows a flowchart illustrating a method 1600 that supports network control and signaling for power circuitry configuration in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1605, the base station may receive an indication of UE capability information for a set of power consumption categories for the UE. The operations of 1605 may be performed according to the methods described herein. In some examples, aspects of the operations of 1605 may be performed by a UE capability manager as described with reference to FIGS. 8 through 11.

At 1610, the base station may determine the UE is capable of operating in a first power consumption category based on the received indication of UE capability information. For example, in some cases, the base station may determine a condition for UE operation in the first power consumption category is that the UE is capable of operating in the first power consumption category (e.g., the UE is capable of an ADC/DAC resolution, number of antennas, etc., associated with the first power consumption category). The operations of 1610 may be performed according to the methods described herein. In some examples, aspects of the operations of 1610 may be performed by a power consumption category manager as described with reference to FIGS. 8 through 11.

At 1615, the base station may transmit, to the UE, an indication of power consumption category switching information based on the determination that the UE is capable of operating in the first power consumption category, where the indication of power consumption category switching information includes an indication of the first power consumption category. The operations of 1615 may be performed according to the methods described herein. In some examples, aspects of the operations of 1615 may be performed by a power consumption category manager as described with reference to FIGS. 8 through 11.

At 1620, the base station may determine the UE is capable of operating in the first power consumption category based on the received indication of UE capability information. The operations of 1620 may be performed according to the methods described herein. In some examples, aspects of the operations of 1620 may be performed by a UE capability manager as described with reference to FIGS. 8 through 11.

At 1625, the base station may determine the condition has been satisfied, where the indication of power consumption category switching information includes an indication of the first power consumption category based on the determination that the condition for UE operation in the first power consumption category has been satisfied. The operations of 1625 may be performed according to the methods described herein. In some examples, aspects of the operations of 1625 may be performed by a power consumption category manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining UE capability information for a plurality of power consumption categories,
   wherein a power consumption category of the plurality of power consumption categories corresponds to
      a UE capability,
      a resolution for an analog-to-digital conversion,
      a resolution for a digital-to-analog conversion,
      an antenna configuration of the UE,
      a radio frequency circuit configuration of the UE,
      an intermediate frequency circuit configuration of the UE, or
      a baseband circuit configuration of the UE;
   transmitting an indication of the UE capability information for the plurality of power consumption categories to a network entity;
   receiving, after transmission of the indication of the UE capability information for the plurality of power consumption categories, an indication of power consumption category switching information comprising a mapping of a plurality of modulation coding schemes,
   wherein a modulation coding scheme of the plurality of modulation coding schemes is mapped to a first power consumption category of the plurality of power consumption categories;
   selecting the first power consumption category from the plurality of power consumption categories based at least in part on the mapping and the modulation coding scheme used by the UE; and
   communicating using the first power consumption category of the plurality of power consumption categories.

2. The method of claim 1, further comprising:
   determining a power consumption level for each corresponding power consumption category of the plurality of power consumption categories based at least in part on
      modem radio frequency circuitry associated with the first power consumption category corresponding to the resolution for the analog-to-digital conversion,
      modem radio frequency circuitry associated with the power consumption category corresponding to the resolution for the digital-to-analog conversion,
      circuitry associated with the power consumption category corresponding to the antenna configuration,
      circuitry associated with the power consumption category corresponding to the radio frequency circuit configuration,
      circuitry associated with the power consumption category corresponding to the intermediate frequency circuit configuration, or
      circuitry associated with the power consumption category corresponding to the baseband circuit configuration.

3. The method of claim 2,
   wherein the indication of the UE capability information for the plurality of power consumption categories comprises the power consumption level for each power consumption category.

4. The method of claim 1,
   wherein receiving the indication of power consumption category switching information comprises:
   applying the first power consumption category of the plurality of power consumption categories based at least in part on the mapping.

5. The method of claim 1,
   wherein receiving the indication of power consumption category switching information comprises:
   receiving, from the network entity, an indication of a threshold for selecting the first power consumption category of the plurality of power consumption categories.

6. The method of claim 5,
   wherein the threshold for selecting the first power consumption category of the plurality of power consumption categories comprises
      a reference signal receive power threshold,
      a reference signal receive quality threshold,
      a signal-to-noise ratio threshold, or
      a signal-to-noise-plus-interference ratio threshold.

7. The method of claim 6, further comprising:
   measuring one or more signals from the network entity;
   determining the measurement of the one or more signals satisfies the threshold; and
   selecting the first power consumption category of the plurality of power consumption categories based at least in part on the determination that the measurement of the one or more signals satisfies the threshold.

8. The method of claim 7,
   wherein the one or more signals comprise
      a primary synchronization signal,
      a secondary synchronization signal,
      a physical broadcast channel transmission,
      a channel state information reference signal,
      a tracking reference signal,
      a remaining system information transmission,
      a random access channel transmission,
      a paging physical downlink control channel transmission,
      a paging physical downlink shared channel transmission, or
      some combination thereof.

9. The method of claim 8,
   wherein the UE uses the one or more signals during idle mode operation.

10. The method of claim 5,
    wherein the threshold for selecting the first power consumption category of the plurality of power consumption categories comprises a thermal state threshold of the UE, a battery status threshold of the UE, or some combination thereof.

11. The method of claim 10, further comprising:
    determining a thermal state of the UE has satisfied the thermal state threshold, a battery status of the UE has satisfied the battery status threshold, or both; and
    selecting the first power consumption category of the plurality of power consumption categories based at least in part on the determination that the thermal state of the UE satisfies the threshold, that the battery status of the UE satisfies the threshold, or both.

12. The method of claim 1,
wherein receiving the indication of power consumption category switching information comprises:
receiving an indication of a quality of service requirement; and
selecting the first power consumption category of the plurality of power consumption categories based at least in part on the indication of the quality of service requirement.

13. The method of claim 1,
wherein the indication of the plurality of power consumption categories comprises the
resolution for the analog-to-digital conversion for the first power consumption category,
the resolution for the digital-to-analog conversion for the first power consumption category,
the antenna configuration of the UE for the first power consumption category, the radio frequency circuit configuration of the UE for the first power consumption category,
the intermediate frequency circuit configuration of the UE for the first power consumption category, or
the baseband circuit configuration of the UE for the first power consumption category.

14. The method of claim 1, further comprising:
selecting the first power consumption category of the plurality of power consumption categories based at least in part on the received indication of power consumption category switching information;
selecting
a first resolution for the analog-to-digital conversion,
a first resolution for the digital-to-analog conversion,
a first antenna configuration,
a number of subarrays,
a number of antennas,
a first radio frequency circuit configuration, or
a first intermediate frequency circuit configuration of the UE, based at least in part on the first power consumption category; and
determining whether to turn on one or more portions of UE circuitry based at least in part on the corresponding selection of
the first resolution for the analog-to-digital conversion,
the first resolution for the digital-to-analog conversion,
the first antenna configuration,
the number of subarrays,
the number of antennas,
the first radio frequency circuit configuration, or
the first intermediate frequency circuit configuration of the UE.

15. A method for wireless communication at a network entity, comprising:
receiving an indication of user equipment (UE) capability information for a plurality of power consumption categories for the UE;
determining a condition for UE operation in a first power consumption category of the plurality of power consumption categories; and
transmitting, to the UE, after receipt of the indication of the UE capability information for the plurality of power consumption categories, an indication of power consumption category switching information,
the power consumption category switching information comprising a mapping of a modulation coding scheme to the first power consumption category of the plurality of power consumption categories,
wherein the power consumption category is selected from the plurality of power consumption categories based at least in part on the modulation coding scheme and the mapping, and in accordance with the determined condition.

16. The method of claim 15, further comprising:
identifying, based at least in part on the received indication,
a power consumption level for each power consumption category of the plurality of power consumption categories,
a resolution for an analog-to-digital conversion for each power consumption category of the plurality of power consumption categories,
a resolution for a digital-to-analog conversion for each power consumption category of the plurality of power consumption categories,
an antenna configuration of the UE for each power consumption category of the plurality of power consumption categories,
a radio frequency circuit configuration of the UE for each power consumption category of the plurality of power consumption categories,
an intermediate frequency circuit configuration of the UE for each power consumption category of the plurality of power consumption categories,
a baseband circuit configuration of the UE for each power consumption category of the plurality of power consumption categories, or
some combination thereof,
wherein the condition is determined based at least in part on the identifying.

17. The method of claim 15,
wherein determining the condition for UE operation in the first power consumption category comprises:
determining, for each of one or more power consumption categories of the plurality of power consumption categories,
a reference signal receive power threshold,
a reference signal receive quality threshold,
a signal-to-noise ratio threshold,
a signal-to-noise-plus-interference ratio, or
some combination thereof.

18. The method of claim 17, further comprising:
transmitting one or more signals comprising
a primary synchronization signal,
a secondary synchronization signal,
a physical broadcast channel transmission,
a remaining system information transmission,
a random access channel transmission,
a paging physical downlink control channel transmission,
a paging physical downlink shared channel transmission, or
some combination thereof,
wherein the condition for UE operation in the first power consumption category is based at least in part on the transmitted one or more signals.

19. The method of claim 15,
wherein determining the condition for UE operation in the first power consumption category comprises:
determining
a thermal state threshold of the UE,
a battery status threshold of the UE, or
some combination thereof.

20. The method of claim 15,
wherein determining the condition for UE operation in the first power consumption category comprises:
determining a mapping of one or more quality of service requirements to one or more power consumption categories of the plurality of power consumption categories,
wherein the power consumption category switching information comprises the mapping; and
transmitting an indication of a quality of service requirement to the UE.

21. The method of claim 15, further comprising:
determining the condition has been satisfied,
wherein the indication of power consumption category switching information comprises an indication of the first power consumption category based at least in part on the determination that the condition for UE operation in the first power consumption category has been satisfied.

22. The method of claim 21,
wherein determining the condition has been satisfied comprises:
determining the UE is operating in the first power consumption category based at least in part on the received indication of UE capability information.

23. An apparatus for wireless communication at a user equipment (UE), comprising:
a processor, memory in electronic communication with the processor; and instructions stored in the memory and executable by the processor to cause the apparatus to:
determine UE capability information for a plurality of UE power consumption categories,
wherein a power consumption category of the plurality of power consumption categories corresponds to
a UE capability,
a resolution for an analog-to-digital conversion,
a resolution for a digital-to-analog conversion,
an antenna configuration of the UE,
a radio frequency circuit configuration of the UE,
an intermediate frequency circuit configuration of the UE,
a baseband circuit configuration of the UE, or
some combination thereof;
transmit an indication of the UE capability information for the plurality of power consumption categories to a network entity;
receive, after transmission of the indication of the UE capability information for the plurality of power consumption categories, an indication of power consumption category switching information comprising a mapping of a plurality of modulation coding scheme,
wherein a modulation coding scheme of the plurality of modulation coding schemes is mapped to a first power consumption category of the plurality of power consumption categories;
select the first power consumption category from the plurality of power consumption categories based at least in part on the mapping and the modulation coding scheme used by the UE; and
communicate using the first power consumption category of the plurality of power consumption categories.

* * * * *